(12) United States Patent
Wilkinson et al.

(10) Patent No.: US 8,437,339 B2
(45) Date of Patent: May 7, 2013

(54) TECHNIQUES TO PROVIDE INTEGRATED VOICE SERVICE MANAGEMENT

(75) Inventors: Tim Wilkinson, Berkely, CA (US); Simon Rabe-Hesketh, Berkeley, CA (US); Matias Duarte, Sunnyvale, CA (US); Matthew Hornyak, San Francisco, CA (US); Justin Kodama, Mountain View, CA (US); Junius Ho, Shoreview, MN (US); Ed Ballot, Mountain View, CA (US); Michael Rizkalla, Los Altos, CA (US); Jess Gibson, Santa Clara, CA (US); Ezekiel Sanborn, Santa Clara, CA (US); Alan Levi, Mountain View, CA (US); Brad Vogel, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 350 days.

(21) Appl. No.: 12/769,318

(22) Filed: Apr. 28, 2010
(Under 37 CFR 1.47)

(65) Prior Publication Data
US 2011/0267985 A1   Nov. 3, 2011

(51) Int. Cl.
*H04L 12/66*   (2006.01)
(52) U.S. Cl.
USPC ........... 370/352; 370/353; 370/354; 370/355; 370/356; 370/401

(58) Field of Classification Search ................... 370/352, 370/353, 354, 355, 356, 465, 493, 495, 400, 370/401; 718/103, 108
See application file for complete search history.

(56) References Cited

U.S. PATENT DOCUMENTS

| | | | |
|---|---|---|---|
| 8,131,267 B2 * | 3/2012 | Lichorowic et al. ....... | 455/412.2 |
| 2003/0039242 A1 | 2/2003 | Moore, Jr. | |
| 2004/0120473 A1 * | 6/2004 | Birch et al. ................ | 379/88.17 |
| 2005/0091058 A1 * | 4/2005 | Biettron et al. ............ | 704/270.1 |
| 2005/0111439 A1 * | 5/2005 | Yarlagadda et al. .......... | 370/352 |
| 2008/0032747 A1 * | 2/2008 | Holt et al. ..................... | 455/563 |
| 2009/0258635 A1 * | 10/2009 | Holt et al. ..................... | 455/413 |
| 2009/0286514 A1 * | 11/2009 | Lichorowic et al. ....... | 455/412.2 |
| 2010/0177882 A1 * | 7/2010 | Taylor et al. ............. | 379/207.02 |

FOREIGN PATENT DOCUMENTS

| KR | 10-2005-0117398 A | 12/2005 |
|---|---|---|
| KR | 10-0738554 B1 | 7/2007 |

OTHER PUBLICATIONS

International Search Report and Written Opinion, International Application No. PCT/US2011/034137, Date of Mailing: Nov. 28, 2011, pp. 1-9.

* cited by examiner

*Primary Examiner* — Chuong T Ho

(57) ABSTRACT

Techniques to provide integrated voice service management are described. An apparatus may comprise a mobile computing device having a voice service manager operative to receive control directives from one or more application programs, and manage one or more service features provided by multiple voice service platforms based on the received control directives, with at least one of the multiple voice service platforms comprising a voice over packet voice service platform. Other embodiments are described and claimed.

35 Claims, 21 Drawing Sheets

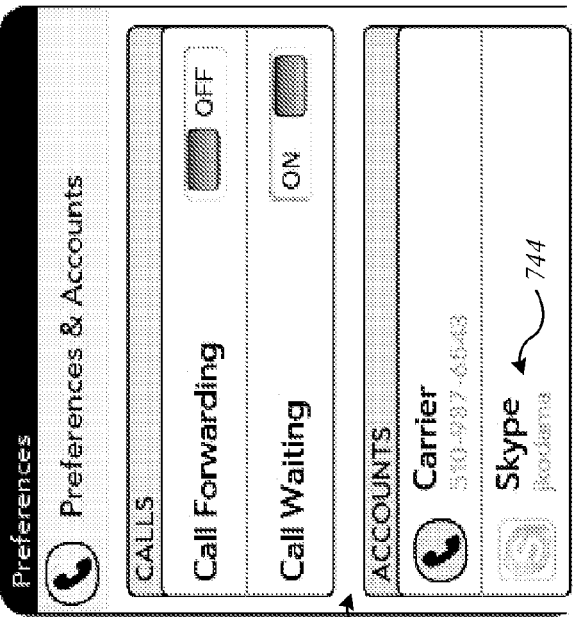
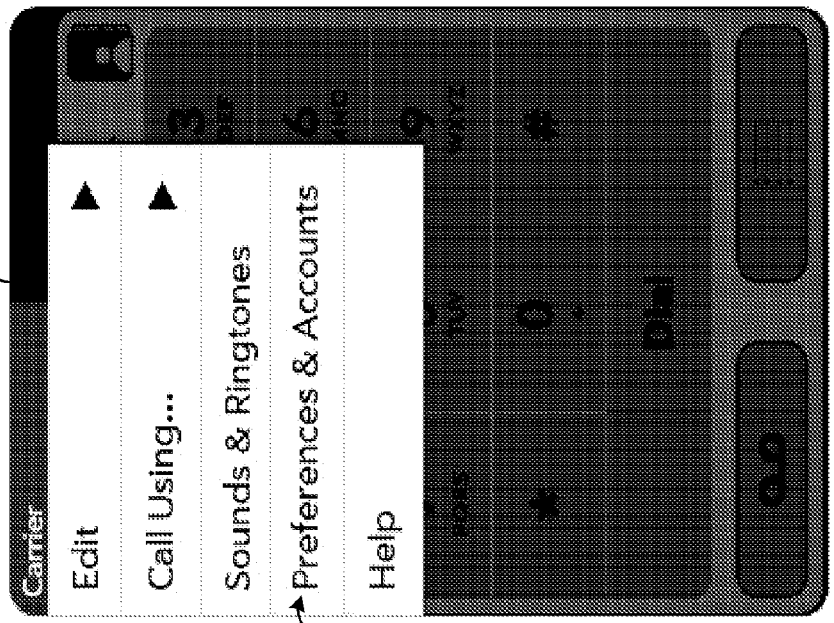
FIG. 7

*2000*

```
RECEIVE CONTROL DIRECTIVES FROM ONE OR MORE
APPLICATION PROGRAMS
2002
```

```
MANAGE ONE OR MORE SERVICE FEATURES PROVIDED BY
MULTIPLE VOICE SERVICE PLATFORMS FOR A MOBILE
COMPUTING DEVICE BASED ON THE RECEIVED CONTROL
DIRECTIVES, WITH AT LEAST ONE OF THE MULTIPLE VOICE
SERVICE PLATFORMS COMPRISING A VOICE OVER PACKET
VOICE SERVICE PLATFORM
2004
```

*FIG. 20*

TECHNIQUES TO PROVIDE INTEGRATED VOICE SERVICE MANAGEMENT

BACKGROUND

Mobile computing devices, such as smart phones, have become highly capable communication devices in recent years. In addition to the wide array of processing capabilities such as digital assistant (PDA) features, including word processing, spreadsheets, synchronization of information (e.g., email) with a desktop computer, and so forth, mobile computing devices also typically include wireless communications capabilities to provide features, such as mobile telephony, mobile email access, web browsing, and content (e.g., video and radio) reception. Exemplary wireless communications technologies include cellular, satellite, and mobile data networking technologies.

Voice service for a mobile computing device is typically provided by a host cellular radiotelephone system. For instance, a mobile computing device may connect to another wired or wireless communication device over a wireless voice channel provided by a cellular radiotelephone system. In the former case the voice signals may partially traverse a wired voice channel provided by the Public Switched Telephone Network (PSTN). However, recent innovations in Voice Over Internet Protocol (VoIP) or Voice Over Packet (VOP) services allow voice communications over both wireless and wired data networks. As such, a mobile computing device may have access to multiple voice service platforms over both voice and data channels. However, manually managing multiple voice service platforms may be tedious and burdensome task for a user. It is with respect to these and other reasons that techniques to improve management of voice services for a mobile computing device are needed.

BRIEF DESCRIPTION OF THE DRAWINGS

FIG. 7 illustrates one embodiment of a fifth user interface.

FIG. 20 illustrates one embodiment of a logic flow.

DETAILED DESCRIPTION

Figure 1:
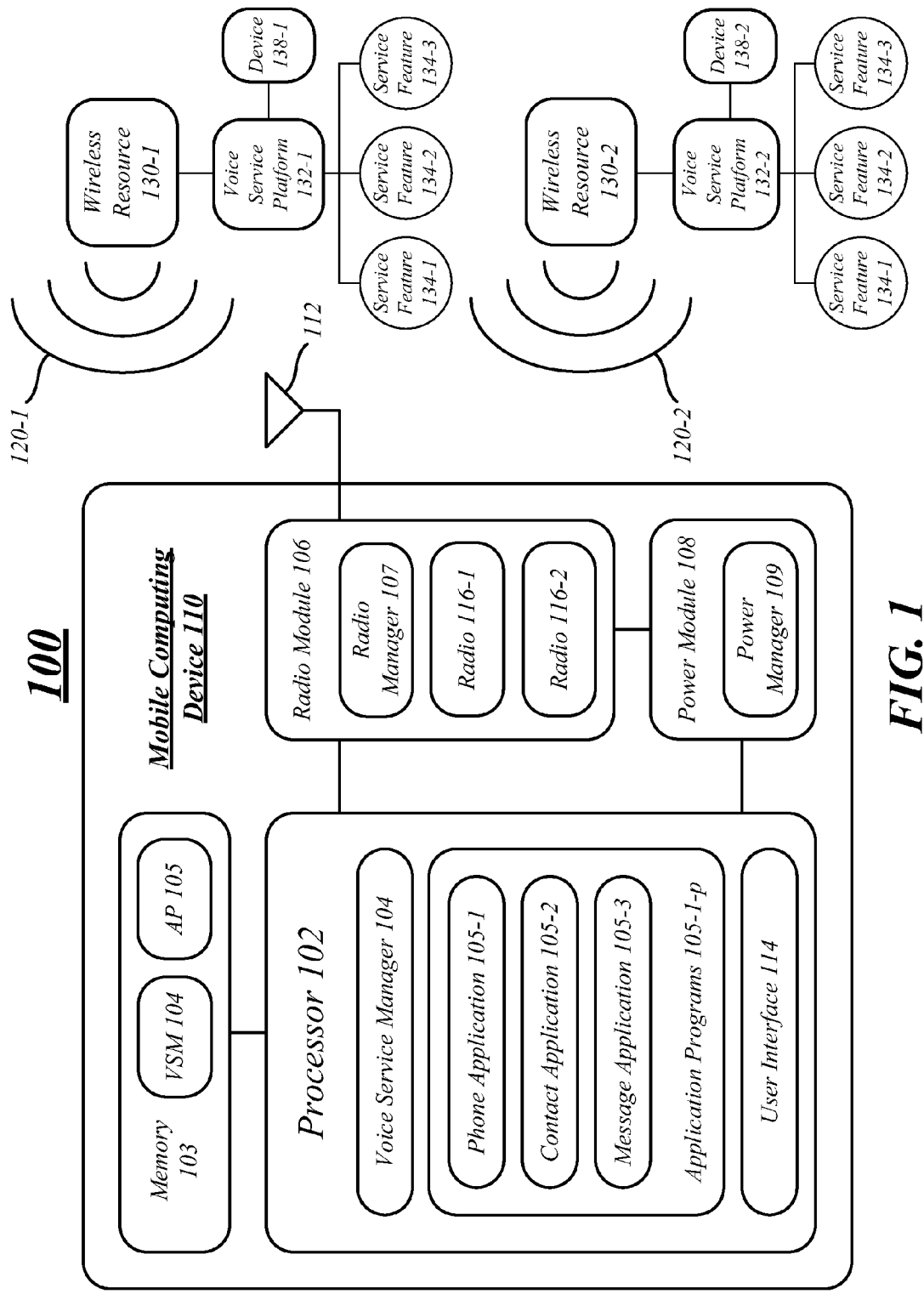
FIG. 1 illustrates one embodiment of a first mobile computing device.

Various embodiments are generally directed to techniques to provide integrated and integrated voice service management for a mobile computing device, such as a smart phone, for example. Some embodiments are particularly directed to techniques to provide integrated voice service management to control various service features provided by multiple voice service platforms, including voice service features, voicemail service features, message service features, among others. This may enhance behavior and performance for various hardware and/or software components of a mobile computing device, such as power conservation, voice quality, costs, and so forth. This may also enhance user convenience by automatically selecting and establishing voice and data connections to one or more voice service platforms based on a set of decision parameters, rules and/or preferences.

A mobile computing device typically comprises different types of radios, usually having at least one radio for voice service features and another radio for data communications. For instance, when implemented as a Global System for Mobile Communications (GSM) and Enhanced Data rates for GSM Evolution (EDGE) device, a mobile computing device may include a first radio designed to use a first set of radio frequencies for voice service features (e.g., 850/900/1800/1900 MHz), and a second set of radio frequencies for data communications (e.g., 2100 MHz). Other exemplary radios may include the Institute of Electrical and Electronics Engineers (IEEE) 802.11 and 802.16 enabled devices for data communications.

As a result of the implementation of multiple radios in a single device combined with advances in cost structures and deployment of VOP technologies, a mobile computing device may now implement or access many different types of VOP voice services using both circuit-switching and packet-switching technologies. This creates a use scenario where multiple voice services may be accessed by a single mobile computing device, thereby providing alternate communications paths for voice communications, such as a mobile telephone call. However, manually controlling access to services provided by multiple voice service platforms may be tedious, time consuming and inefficient for a user. For instance, each service may have its own phone number, screen name and/or security credentials. Keeping track of all of these details can be difficult, making it cumbersome to select a particular voice service when a user subscribes to more than one. Furthermore, a user is forced to choose a particular application and/or voice service platform each time the user desires to place a phone call. This requires learning how to use multiple applications and keeping track of which services are available for a given network to which they are connected. In addition, each voice service platform typically requires a standalone application to be downloaded and implemented by a mobile computing device. These standalone applications are not integrated with each other, and are not integrated with an existing operating system or other system and application programs already implemented for a given mobile computing device. As a result, each time a user switches to a different voice service platform, the user must use different modalities, input devices and user interfaces, thereby leading to an inconsistent user experience.

To solve these and other problems, enhanced voice service management techniques may be implemented to integrate and manage different types of voice services on behalf of a user or device, automating some or all of the service features provided by, or associated with, each of the different voice service platforms. Implementation and operational details for each voice service platform may be integrated with standard application programs (e.g., a phone dialer for a phone application) already implemented for a given mobile computing device thereby providing a familiar, consistent and convenient user interface for a user. When a user places a call, the enhanced voice service management techniques will automatically select an appropriate voice service platform to use based on such factors as a current connected network and its calling services, a region where the called party is located, need to present a particular phone number or screen name to the called party, calling services available to the called party, and so forth. If the enhanced voice service management techniques needs assistance with a decision, or the user wants more manual control, a user interface may present available services to a user along with information to assist the user in making decisions, such as features and costs of placing a call using each service. When receiving voicemail messages, the enhanced voice service management techniques adjust the features and data available in ach voicemail message such that it can be presented in a common user interface (e.g., visual voicemail).

The various enhanced voice service management techniques provide several advantages over conventional techniques. The enhanced voice service management techniques are superior to conventional techniques because they manage details of optimizing a voice calling experience, allowing users to focus on content for their call rather than burdening them with technical details about various voice services. It also allows them to use features integrated into an existing phone application and/or operating system. For instance, enhanced voice service management techniques reduces or eliminates the need for a user to manually manage different login accounts, contact information, messaging channels, security credentials, and so forth. This also reduces or eliminates the need for a user to access and launch separate standalone programs for each voice service platform. The enhanced voice service management techniques may also result in increases in device performance, such as power conservation, voice quality, memory utilization, application integration and responsiveness, software upgrades, processor loads, operating system efficiency, software stack management, legacy implementations, and so forth.

In various embodiments, an enhanced voice service manager may generally implement techniques to provide integrated voice service management to control various service features of voice service platforms, including voice service features, voicemail service features, message service features, among others. In one embodiment, for example, a mobile computing device may implement a voice service manager operative to receive control directives from one or more application programs, and manage one or more service features provided by multiple voice service platforms based on the received control directives, with at least one of the multiple voice service platforms comprising a voice over packet (VOP) voice service. VOP voice services may sometimes be referred to as "cloud services" or "web services" as they are typically supported by a network entity. Examples of VOP voice services may include web-based voice services, such as Google™ Voice and Skype™, among others. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements, nodes or modules in a certain topology by way of example, the embodiment may include other combinations of elements, nodes or modules in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment. It should also be understood that the use of the term control to refer to data and/or signals throughout the application can refer to data flowing in any direction as control and/or status data or signals.

FIG. 1 illustrates one embodiment of an apparatus that may communicate across different types of wireless links. In particular, FIG. 1 shows a communications system 100 comprising various representative elements, including a mobile computing device 110 capable of communicating via radio signals 120-1-$m$ with one or more wireless resources 130-1-$n$. The mobile computing device 110 may include by way of example and not limitation a processor 102, a memory 103, a voice service manager 104, one or more application programs 105-1-$p$, a radio module 106, a power module 108, an antenna 112, and a user interface 114. The radio module 106 may further include a radio manager 107 and one or more radios 116-1-$q$. The power module 108 may further include a power manager 109. These elements or portions of these elements may be implemented in hardware, software, firmware, or in any combination thereof. The embodiments are not limited to these depicted elements.

In some embodiments, one or more interfaces may employ various techniques to exchange information between the elements of the mobile computing device 110. For example, an interface may activate and/or detect activated signal lines. Such signal lines may be dedicated to particular signals. Alternatively, an interface may generate data messages to be transmitted across various connections. Exemplary connections may include a parallel interface, a serial interface, a bus interface, and/or a data network.

In various embodiments, the mobile computing device 110 may be generally configured to support or provide cellular voice communication, wireless data communication and computing capabilities. The mobile computing device 110 may be implemented as a combination handheld computer and mobile telephone, sometimes referred to as a smart phone. Examples of smart phones include, for example, Palm® products such as the Palm Pre™, Palm Pixi™ and Palm Treo™ line of smart phones. Although some embodiments may be described with the mobile computing device 110 implemented as a smart phone by way of example, it may be appreciated that the embodiments are not limited in this context. For example, the mobile computing device 110 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/ PDA, mobile unit, subscriber station, user terminal, portable computer, handheld computer, palmtop computer, wearable computer, media player, pager, messaging device, data communication device, and so forth. Additional details for a mobile computing device may be described in more detail with reference to FIG. 21.

The processor 102 may comprise a general purpose processor, a communications processor or an application specific processor arranged to provide general or specific computing capabilities for the communications system 100. For example, the processor 102 may perform operations associated with higher layer protocols and applications. For instance, the processor 102 may be implemented as a host processor to provide various user applications, such as telephony, text messaging, email, web browsing, word processing, video signal display, and so forth. In addition, the processor 102 may provide one or more functional utilities that are available to various protocols, operations, and/or applications. Examples of such utilities include operating systems, device drivers, user interface functionality, and so forth.

The memory 103 may comprise computer-readable media such as volatile or non-volatile memory units arranged to store programs and data for execution by the processor 102. As depicted in FIG. 1, the memory 103 may store a voice service manager 104 in the form of executable program instructions, code or data. Additionally or alternatively, the memory 103 may also store one or more application programs 105-1-$p$ and/or a user interface 114 in the form of executable program instructions, code or data. The processor 102 may retrieve and execute the program instructions, code or data from the memory 103 to adaptively control one or more operational parameters for the mobile computing device 110, such as operation and/or communication parameters of the radio module 106. Although the voice service manager 104, the application programs 105-1-$p$ and/or the user interface 114 are described as part of the memory 103 for execution by the processor 102, it may be appreciated that the voice service manager 104, the application programs 105-1-$p$ and/or the user interface 114 may be stored and executed by other memory and processing resources available to the mobile computing device 110, such as a radio or communications processor and accompanying memory implemented by the radio module 106. Further, although the voice service manager 104, the application programs 105-1-$p$ and the user interface 114 are depicted as software executed by a processor, it may be appreciated that some or all of these elements may be implemented in hardware as well using one or more integrated circuits, for example. The embodiments are not limited in this context.

The application programs 105-1-$p$ are generally designed to allow a user to accomplish one or more specific tasks. Examples of application programs 105-1-$p$ may include, without limitation, one or more message applications (e.g., telephone, voicemail, facsimile, e-mail, IM, SMS, MMS, video conferencing), a web browser application, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. In various implementations, the application programs may provide one or more graphical user interfaces (GUIs) to communicate information between the mobile computing device 110 and a user. In some embodiments, application programs may comprise upper layer programs running on top of the OS of the host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication. The illustrated embodiment shown in FIG. 1 illustrates a phone application 105-1, a contact application 105-2, and a message application 105-3. It may be appreciated, however, that the mobile computing device 110 may have other application programs 105-1-$p$ as desired for a given implementation. The embodiments are not limited in this context.

The user interface 114 may comprise any user interface or graphic user interface (GUI) suitable for use with the mobile computing device 110. The user interface 114 may comprise a stand-alone application or part of another application, such as an operating system. The user interface 114 may be arranged to receive information from the voice service manager 104 and/or the application program 105-1-$p$, and generate a user interface message for display on a digital display of the mobile computing device 110. The user interface message may also contain various user interface elements, such as radio buttons or menu choices, to receive user commands via a suitable input device (e.g., a touch screen, thumb board, keypad, trackball, scroll wheel, and so forth).

The radio module 106 may comprise one or more radios 116-1-$q$ (also referred to as wireless transceivers), each having various radio elements, including a radio processor, one or more transceivers, amplifiers, filters, switches, and so forth. The radio module 106 may communicate with remote devices across different types of wireless links utilizing various wireless wide area network (WWAN) communications techniques. For example, the radio module 106 may communicate across wireless links provided by one or more cellular radiotelephone systems. Examples of cellular radiotelephone systems may include Code Division Multiple Access (CDMA) systems, GSM systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth. The radio module 106 (or additional radio modules) may also communicate across data networking links provided by one or more cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth. The embodiments, however, are not limited to these examples.

In some cases, the radio module 106 may additionally or alternatively communicate across various non-cellular communications links, such as a wireless local area network (WLAN). The radio module 106 may be arranged to provide voice and/or data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 110 may also utilize different types of shorter range wireless systems, or wireless personal area networks (WPAN) such as a Bluetooth system operating in accordance with the Bluetooth Special Interest Group (SIG) series of protocols, including Bluetooth Specification versions v1.0, v1.1, v1.2, v1.0, v2.0, v2.1, v3.0 with Enhanced Data Rate (EDR) (as well as one or more Bluetooth Profiles) and any revisions, progeny and variants, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

It may be appreciated that the radio module 106 may utilize different communications elements (e.g., radio processors, transceivers, etc.) to implement different communications techniques. Furthermore, the radio module 106 may support multiple communications techniques by implementing multiple sets of corresponding radio equipment. For example, the radio module 106 may support GSM communications using the radio 116-1, IEEE 802.xx (e.g., 802.11 or 802.16) communications using the radio 116-2, Bluetooth communications using the radio 116-3 (not shown), and so forth. The embodiments are not limited in this context.

The radio module 106 may have a radio manager 107 arranged to control some or all of the operations for the radio module 106. For instance, the radio manager 107 may cause one or more radios implemented by the radio module 106 to periodically or continuously scan wireless shared media, such as one or more portions of the radio-frequency (RF) spectrum. The radio module 106 may implement a scanning algorithm to perform various scanning operations for radio energy. Radio energy may refer to RF energy used by a radio or wireless transceiver for communicating information, rather than spurious energy received from various electronic devices, such as a microwave, monitor, television, and so forth. For example, the radio module 106 and/or the radio manager 107 may measure a received radio signal strength, received signal strength (RSS) or received signal strength indication (RSSI) from nearby wireless resources (collectively referred to herein as "RSSI"). An RSSI is typically a measurement of the power present in a received radio signal in arbitrary units. The RSSI may provide an indication of how much information may be communicated between devices. Typically a lower RSSI implies lower information rates or quality, while a higher RSSI implies higher information rates or quality.

The scanning operations may include scanning for radio energy of a given RSSI in the appropriate bands or sub-bands of the RF spectrum allocated to the one or more transceivers or radios implemented by the radio module 106. For example, the radio module 106 may scan for various radio signals 120-1-$m$ received from various wireless resources 130-1-$n$. The wireless resources 130-1-$n$ may utilize a radio module implementing the same or similar communication techniques as implemented for the radio module 106. The radio module 106 may perform the scanning operations using a scan list to scan various sets of frequencies. The radio module 106 may perform scanning operations for any number of reasons, such as establishing, managing or terminating a voice communication session or a data communication session, performing hand-off operations when the mobile computing device 110 is moving between wireless resources (e.g., 130-1, 130-2), switching communication channels for the same wireless resource (e.g., 130-1) due to bandwidth or quality issues, and so forth.

The radio manager 107 may use the information collected during scanning operations to measure or estimate available bandwidth for the wireless communication channel based on one or more communication parameters. In general, digital bandwidth, network bandwidth or just bandwidth is a measure of available or consumed data communication resources expressed in bits per second (bit/s) or multiples of it (e.g., kbit/s, Mbit/s etc). Bandwidth may refer to bandwidth capacity or available bandwidth in bit/s, which typically means the net bit rate, channel capacity or the maximum throughput of a logical or physical communication path in a digital communication system. The radio manager 107 may collect or measure various characteristics of an RF channel to estimate an available bandwidth for the RF channel. This measurement may also include previous samples, such as previously consumed bandwidth corresponding to an average data rate of successful data transfer through a communication path, sometimes referred to as "throughput" or "goodput." The radio manager 107 may use prospective or historical information about the RF channel to generate an available bandwidth parameter for one or more radios of the radio module 106.

It is worthy to note that although the radio manager 107 is shown implemented as part of the radio module 106 in the depicted embodiment, it may be appreciated that the radio manager 107 may be implemented in other parts of the mobile computing device 110, such as the processor 102 and memory 103, for example. The embodiments are not limited in this context.

The power module 108 may be arranged to provide power for the mobile computing device 110. In one embodiment, the power module 108 may comprise a power supply (or power supply unit) and the power manager 109. The power supply may be arranged to provide electrical power to the various elements of the mobile computing device 110, and include a power distribution system as well as primary and/or secondary sources of energy. The primary source may include AC line voltage converted to a well-regulated lower-voltage DC for electronic devices (e.g., using a transformer or power converter). The secondary source may include a portable power source, such as a battery, that provides lower-voltage DC as well. The battery may comprise rechargeable and/or non-rechargeable types of batteries.

The power manager 109 may manage various operations for the power supply and/or the mobile computing device 110, such as increasing or decreasing an amount of power provided to a given set of elements for the mobile computing device 110, or placing a given set of elements in various power consumption modes. The power manager 109 may also be arranged to measure an amount of remaining power capacity available from the power supply, and generate an available power parameter. The available power parameter may represent, for example, a discharge rate having a unit of amperes (A), milliampere (mA), ampere-hour (Ah), milliampere-hour (mAh), or milliampere second (mAs), or some other measurable power unit. In one embodiment, the available power parameter may vary as a function of radio signal conditions of a given RF operating environment. For example, better RF conditions typically consume less transmit power, and therefore a radio from the radio module 106 may transmit at a lower power level. As a result, x mA of a battery is able to last longer. By way of contrast, under worse RF conditions, the same x mA of battery may last for a shorter period of time since the radio has to transmit at higher power level. In one embodiment, for example, the power manager 109 may exchange information with the radio manager 107 to factor in radio signal conditions when determining an available power parameter for the power supply of the power module 108.

The wireless resources 130-1-n may comprise any wireless device, fixed or mobile, utilizing a radio module implementing the same or similar communication techniques as implemented for the radio module 106. Examples of wireless resources 130-1-n may include without limitation a wireless access point for a WLAN such as an 802.11 or 802.16 system, a base station or node B for a WWAN such as a cellular radiotelephone system, a wireless gateway for an enterprise network, a peer device such as another mobile computing device 110, a Bluetooth device for a WPAN, and so forth.

In general operation, the radio module 106 may receive radio signals from one or more wireless resources 130-1-n, such as a wireless access point or base station. In one embodiment, for example, the radio manager 107 may be operative to collect one or more samples for the one or more wireless resources 130-1-n based on the received radio signals. The sample may be some measurable characteristic of the one or more wireless resources, such as a RSSI value and/or SNR value derived from the received radio signals of the one or more wireless resources, a number of wireless resources 130-1-n derived from the received radio signals, a communication protocol used by one or more wireless resources 130-1-n, an application program used by one or more wireless resources 130-1-n, a parameter or control directive received from one or more wireless resources 130-1-n, and so forth. Other measurable characteristics for the wireless resources 130-1-n may be collected as well. The embodiments are not limited in this context.

By virtue of the various radios 116-1-q implemented by the radio module 106, some of which are capable of providing voice services over dedicated voice channels as well as VOP services over data channels, the mobile computing device 110 may be arranged to support various service features 134-1-s offered by different voice service platforms 132-1-r. The voice service manager 104 may generally implement techniques to provide integrated voice service management to control various service features 134-1-s of voice service platforms 132-1-r, including one or more voice service features 134-1, voicemail service features 134-2, message service features 134-3, and so forth. The voice service manager 104 may be arranged to manage the various different types of service features 134-1-s on behalf of a user or device, automating some or all of the service features 134-1-s provided by, or associated with, each of the different voice service platforms 132-1-r. The various application programs 105-1-p may be communicatively coupled to the voice service manager 104, and may access the various service features of the various voice service platforms 132-1-r through the voice service manager 104, or vice-versa. The user interface 114 may be communicatively coupled to the application programs 105-1-p and the voice service manager 104 to provide custom GUI views to a user and receive user input for enhanced voice service management.

Voice service platforms 132-1-r may be communicatively coupled to one or more electronic devices 138-1-d. Electronic devices 138-1-d may comprise any end point device capable of communicating voice and data information with the mobile computing device 110. Examples of electronic devices 138-1-d may comprise any of those given for the mobile computing device 110 and/or the wireless resources 130-1-n, further including user equipment (UE) such as a telephone. In one embodiment, for example, the mobile computing device 110 and one or more of the electronic devices 138-1-d may communicate voice and data information for any of the service features 134-1-s provided by the voice service platforms 132-1-r. The embodiments are not limited in this context.

Figure 2:
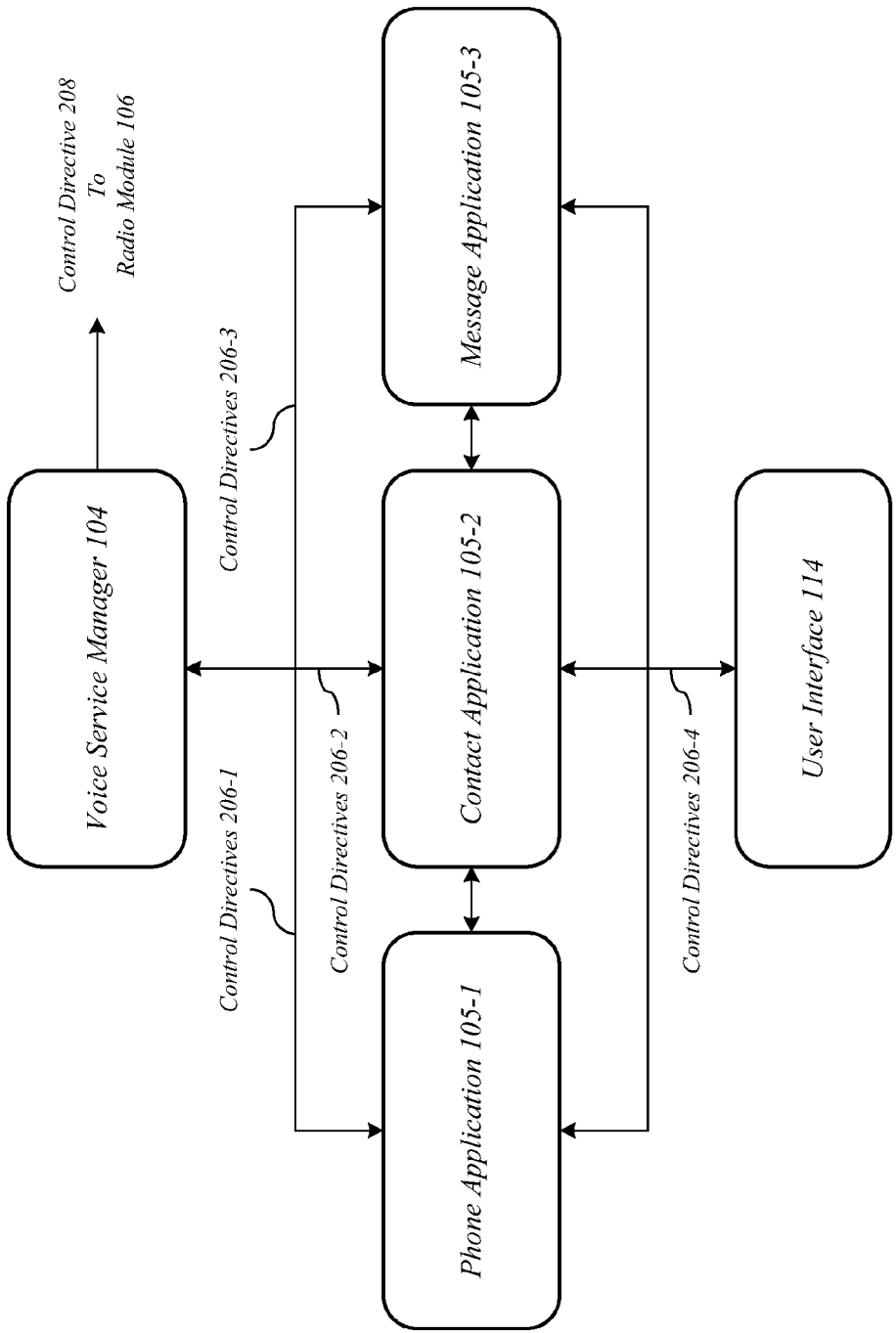
FIG. 2 illustrates one embodiment of a logic diagram.

FIG. 2 illustrates a logic diagram 200. The logic diagram 200 may illustrate one or more interfaces that may employ various techniques to exchange information between the elements of the mobile computing device 110, such as those shown and described with reference to the mobile computing device 110 of FIG. 1. For example, an interface may activate and/or detect activated signal lines. Such signal lines may be dedicated to particular signals. Alternatively, an interface may generate data messages to be transmitted across various connections. Exemplary connections may include a parallel interface, a serial interface, a bus interface, and/or a data network.

In particular, FIG. 2 illustrates an exemplary voice service management architecture suitable for managing various service features 134-1-s for the mobile computing device 110. As shown in FIG. 2, the voice service manager 104 may be communicatively coupled to each of the application programs 105-1-p and the user interface 114 to exchange information with each other over one or more communications buses and associated interfaces. In various embodiments, the voice service manager 104 may be operative to communicate one or more control directives 206-1-t with the various application programs 105-1-p, and manage one or more service features 134-1-s provided by multiple voice service platforms 132-1-r based on the received control directives, with at least one of the multiple voice service platforms 132-1-r comprising a voice over packet (VOP) voice service. For instance, the voice manager 104 may manage or control different voice service platforms 132-1-r accessible via one or more radios 116-1-q of the radio module 106 on behalf of the mobile computing device 110 in general, and the application programs 105-1-p, in particular.

The voice service platforms 132-1-r may each comprise, or be implemented as, any equipment or devices (including hardware and/or software) implementing transmission technologies for delivery of voice service features over a network, including circuit-switched, packet-switched networks, and/or a combination of both.

In one embodiment, for example, one or more of the voice service platforms 132-1-r may comprise a communications platform (e.g., a switching center) maintained by a cellular radiotelephone system provider offering conventional voice channels and/or data channels, and may be referred to herein as a carrier voice service platform 132-1. In this case, the mobile computing device 110 may form a communication channel with the carrier voice service platform 132-1 by communicating radio signals 120-1 with one or more wireless resources 130-1. The wireless resource 130-1 may comprise, for example, a cellular network infrastructure component, such as a base station or Node B, and in some cases may include co-located data networking equipment (e.g., GPRS, EDGE, EVDO, HSDPA and/or HSUPA infrastructure equipment). The carrier voice service platform 132-1 may further include a switching center, gateway or bridge to establish a communication channel with an electronic device 138-1 via a network. The network may comprise a circuit-switched network with dedicated voice channels, such as the PSTN, or a packet-switched network such as the Internet. It may be appreciated that the mobile computing device 110 may form a data connection with the wireless resource 130-1 via cellular data network equipment (e.g., GPRS, EDGE, EVDO, HSDPA and/or HSUPA infrastructure equipment) to offer VOP services via a cellular radiotelephone system platform.

In one embodiment, for example, one or more of the voice service platforms 132-1-*r* may comprise a communications platform offered by a network service provider (e.g., an Internet Service Provider or Web Service Provider) offering conventional voice channels and/or data channels, and may be referred to herein as a VOP voice service platform 132-2. In this case, the mobile computing device 110 may form a communication channel with the carrier voice service platform 132-2 by communicating radio signals 120-2 with one or more wireless resources 130-2. The wireless resource 130-2 may comprise, for example, a wireless access point for an IEEE 802.11 or IEEE 802.16 network. The VOP voice service platform 132-2 may further include a switching center, gateway or bridge to establish a communication channel with an electronic device 138-2 via a network. The network may comprise a circuit-switched network with dedicated voice channels, such as the PSTN, or a packet-switched network such as the Internet. In the former case, equipment would be needed to convert between circuit-switched signals and packet-switched signals, and vice-versa.

The VOP voice service platform 132-2 represents a particular subset of service features, and may refer to any equipment or devices (including hardware and/or software) implementing transmission technologies for delivery of voice service features over a packet-switched network, such as Voice Over Internet Protocol (VoIP), IP telephony, Internet telephony, Voice Over Broadband (VoBB), broadband telephony, broadband phone, and so forth. Examples of VOP voice services may include web-based voice services, such as Google Voice and Skype, among others. A web-based voice service typically provides a unique telephone number, chosen by a user from available numbers in selected area codes. Inbound calls to the selected number are forwarded to other phone numbers of the user, which may be configured to ring selectively or simultaneously when the selected number receives a call. The user may answer and receive the call on any of the ringing phones. Outbound calls may be placed to domestic and international destinations by dialing the selected number or from a web-based application. The embodiments are not limited to web-based voice services, and may also operate with proprietary VOP voice services, such as Cisco® Unified Communications IP Telephony voice services, for example. The embodiments are not limited in this context.

It is worthy to note that in some embodiments, the carrier voice service platform 132-1 or the VOP voice service platform 132-2 may be discussed with reference to specific service features (e.g., voice service features 134-1, voicemail service features 134-2, message service features 134-3, etc.), however, the embodiments are not limited to these particular examples. The embodiments are not limited in this context.

Each of the voice service platforms 132-1-*r*, including the carrier voice service platform 132-1 and the VOP voice service platform 132-2, may offer one or more service features 134-1-*s*. For instance, the VOP voice service platform 132-2 may include a VOP voice service feature 134-1, a voicemail service feature 134-2, and a message service feature 134-3. It may be appreciated that other voice service platforms 132-1-*r* (including other VOP voice service platforms) may have the same or different service features 134-1-*s* to those discussed for voice service platform 132-2. The service features 134-1-*s* may each comprise, or be implemented as, any service options associated with a given voice service platform 132-1-*r*. Examples of service features 134-1-*s* for a voice service platform 132-1-*r* may include without limitation voice service features, call history, call set-up, call tear-down, call handling, call management, administrative services, conference calling, call forwarding, call switching, call screening, call blocking, voice transcription or speech-to-text (STT), text transcription or text-to-speech (TTS), voicemail, visual voicemail, message service features, video conferencing services, multimedia collaboration sessions, and so forth. The embodiments are not limited in this context.

In various embodiments, the voice service manager 104 and the phone application 105-1 may interoperate to manage access and use of any of the voice service platforms 132-1-*r* and associated service features 134-1-*s*. The phone application 105-1 may interoperate with the user interface 114 to implement and manage telephony services for the mobile computing device 110, such as initiating outgoing telephone calls, receiving incoming telephone calls, establishing call conferences, call forwarding, call hold, audio levels, alerts, ringtones, speed-dialing, cellular telephone services, VOP services, Push-to-Talk (PTT) services, and so forth. In one embodiment, the phone application 105-1 may send one or more control directives 206-1 to the voice service manager 104 to initiate voice service features 132-1 or voicemail service features 132-2 provided by one of the multiple voice service platforms 132-1-*r*.

In various embodiments, the voice service manager 104 and the contact application 105-2 may interoperate to manage access and use of any of the voice service platforms 132-1-*r* and associated service features 134-1-*s*. The contact application 105-2 may interoperate with the user interface 114 to implement and manage contact information for the mobile computing device 110. The contact information may include personal information for a contact, one or more contact identifiers, address information, photos, and other information found in a conventional personal information manager (PIM). In one embodiment, the contact application 105-2 may send one or more control directives 206-2 to the voice service manager 104 to initiate voice service features 132-1 or voicemail service features 132-2 provided by one of the multiple voice service platforms 132-1-*r*.

In various embodiments, the voice service manager 104 and the message application 105-3 may interoperate to manage access and use of any of the voice service platforms 132-1-*r* and associated service features 134-1-*s*. In one embodiment, for example, the message application 105-3 may send one or more control directives 206-3 to the voice service manager 104 to initiate message service features 132-3 associated with one of the multiple voice service platforms 132-1-*r*. The mobile computing device 110 may comprise or implement one or more message applications 105-3 arranged to communicate various types of messages in a variety of formats. Each of the message applications 105-3 may be representative of a particular kind of transport, enabling handling of messages of particular types and formats for the particular application. The message applications 105-3 may comprise without limitation a facsimile application, a video message application, an instant messaging (IM) application, a chat application, an email application, a short message service (SMS) application, a multimedia message service (MMS) application, a social network system (SNS) application, and so forth. It is to be understood that the embodiments are not limited in this regard and that the message applications 105-3 may include any other type of messaging or communications application which is consistent with the described embodiments. It also is to be appreciated that the mobile computing device 110 may implement other types of applications in addition to message applications 105-3 which are consistent with the described embodiments.

In various embodiments, the voice service manager 104 may be operative to receive one or more control directives 206-1-*t* from the various application programs 105-1-*p*, and manage one or more service features 134-1-*s* provided by multiple voice service platforms 132-1-*r* based on the received control directives 206-1-*t*. For instance, the voice service manager 104 may receive a control directive 206-1-*t* to initiate one or more service features 134-1-*s*, such as a voice service feature 132-1, a voicemail service feature 132-2 or a message service feature 132-3, provided by one of the multiple voice service platforms 132-1-*r*. The particular voice service platform 132-1-*r* and/or associated service feature 134-1-*s* may be determined, in part, by the received control directive 206-1-*t* itself.

In various embodiments, a control directive 206-1-*t* may include a contact identifier. A contact identifier may comprise any identifier capable of identifying a user or a device, such as a telephone number, an email address, a network address, an Internet Protocol (IP) address, an IP version 4 (IPv4) address, an IP version 6 (IPv6) address, a universal resource locator (URL), a domain name, a hardware address (e.g., a media access controller address), VoIP or VOP display objects, instant messaging (IM) addresses, Skype accounts, Google accounts, photo display objects, location information, login information, authentication information, authorization information, password, personal identification number (PIN), globally unique identifier (GUID), and so forth. The contact identifier may vary in accordance with the type of communication technique used to communicate information. For example, a contact identifier may comprise a telephone number when the type of communication technique is telephone call. In another example, the contact identifier may comprise an IP address when the type of communication technique is a VoIP telephone call or file transfer protocol (FTP) request. In yet another example, the contact identifier may comprise an email address when the type of communication technique is an email or IM message. It may be appreciated that the types of contact identifiers and communication techniques may vary as desired for a given implementation, and the embodiments are not limited in this context.

In one embodiment, the voice service manager 104 may be arranged to receive a control directive 206-1-*t* having a unique contact identifier for one of the multiple voice service platforms 132-1-*r*. A unique contact identifier is a single contact identifier (e.g., a telephone number or email address) that maps to a single voice service platform 132-1-*r* and/or associated service feature 134-1-*s*. In other words, a unique contact identifier has a one-to-one correspondence with a voice service platform 132-1-*r* and/or service feature 134-1-*s*. In this case, the voice service manager 104 may give priority to using the specific voice service platform 132-1-*r* and/or associated service feature 134-1-*s* corresponding to the unique contact identifier before attempting to use any other voice service platforms 132-1-*r* and/or associated service feature 134-1-*s*. Additionally or alternatively, the voice service manager 104 may exclusively use the specific voice service platform 132-1-*r* and/or associated service feature 134-1-*s* corresponding to the unique contact identifier without attempting to use any other voice service platforms 132-1-*r* and/or associated service feature 134-1-*s*.

In one embodiment, for example, the voice service manager 104 may be arranged to receive a control directive 206-1-*t* having a shared contact identifier. A shared contact identifier may represent or be associated with multiple contact identifiers, with each contact identifier associated with a specific voice service platform 132-1-*r* and/or associated service feature 134-1-*s*. In other words, a shared contact identifier has a one-to-many correspondence with a voice service platform 132-1-*r* and/or service feature 134-1-*s*. In this case, the voice service manager 104 may use a selection algorithm and set of rules or user preferences to select a particular voice service platform 132-1-*r* and/or associated service feature 134-1-*s* from among all of the available voice service platforms 132-1-*r* and/or associated service feature 134-1-*s*.

A user typically has multiple entry points to initiate a particular service feature 134-1-*s* provided by one or more of the voice service platforms 132-1-*r*, such as a voice communication (e.g., a telephone call). For instance, the voice service manager 104 may receive a control directive 206-1 from the phone application 105-1 to initiate the voice service feature 132-1 provided by one of the multiple voice service platforms 132-1-*r*. Additionally or alternatively, the voice service manager 104 may receive a control directive 206-2 from the contact application 105-2 to initiate a voice service feature 132-2 provided by one of the multiple voice service platforms 132-1-*r*. The voice service manager 104 may extract a contact identifier from either of the control directives 206-1, 206-2, select a particular voice service platform 132-1-*r* based on the extracted contact identifier, and send one or more control directives 208 to the radio module 106 to initiate a call connection with or through the appropriate wireless resource 130-1-*n*.

Voice Service Features

In various embodiments, the voice service manager 104 and the phone application 105-1 and/or the contact application 105-2 may interoperate to manage access and use of any of the voice service platforms 132-1-*r* and associated service features 134-1-*s*. In one embodiment, the voice service manager 104 may receive one or both control directives 206-1, 206-2 to initiate voice service features 132-1 provided by one of the multiple voice service platforms 132-1-*r*. The voice service manager 104 may automatically (or under user direction) select one of the voice service features 132-1 offered by the multiple voice service platforms 132-1-*r*. The voice service manager 104 may then establish a voice communication session with another device (e.g., wireless resource 130-1-*n*, electronic device 138-1-*d*, etc.) over a wireless communications channel 120-1-*m* using the selected voice service platform 132-1-*r*.

The voice service manager 104 may automatically select one of the voice service features 132-1 offered by the multiple voice service platforms 132-1-*r*. When a user attempts to place a call, the phone application 105-1 will interface with the voice service manager 104 to find an optimal calling service (e.g., voice service feature 134-1 of a given voice service platform 132-1-*r*) to reach the called party. If a user has chosen to automatically use the optimal voice calling service, the voice service manager 104 will return connection information for placing a call to the phone application 105-1 or the radio module 106. If a user desires to manually select a voice calling service, the voice service manager 104 may return via user interface 114 information helpful in deciding which voice calling service to use, such as a list of which voice service platforms 132-1-*r* are available, costs associated with voice service feature 134-1 of each voice service platforms 132-1-*r*, reliability indicators, quality indicators, feature indicators, and so forth. Once a user selects a given voice service platform 132-1-*r*, the phone application 105-1 will query the voice service manager 104 for connection information needed to place a call using the selected service. The phone application 105-1 and/or the voice service manager 104 may then attempt to complete a call using the selected service. A history of user selections may be maintained, and used to order or prioritize a list of which voice service platforms 132-1-*r* are available when future calls are made.

Further operations for the voice service manager 104, the phone application 105-1 and the contact application 105-2 may be described using one or more GUIs provided by the user interface 114 via one or more control directives 206-4, examples of which are provided in FIGS. 3-10.

Figure 3:
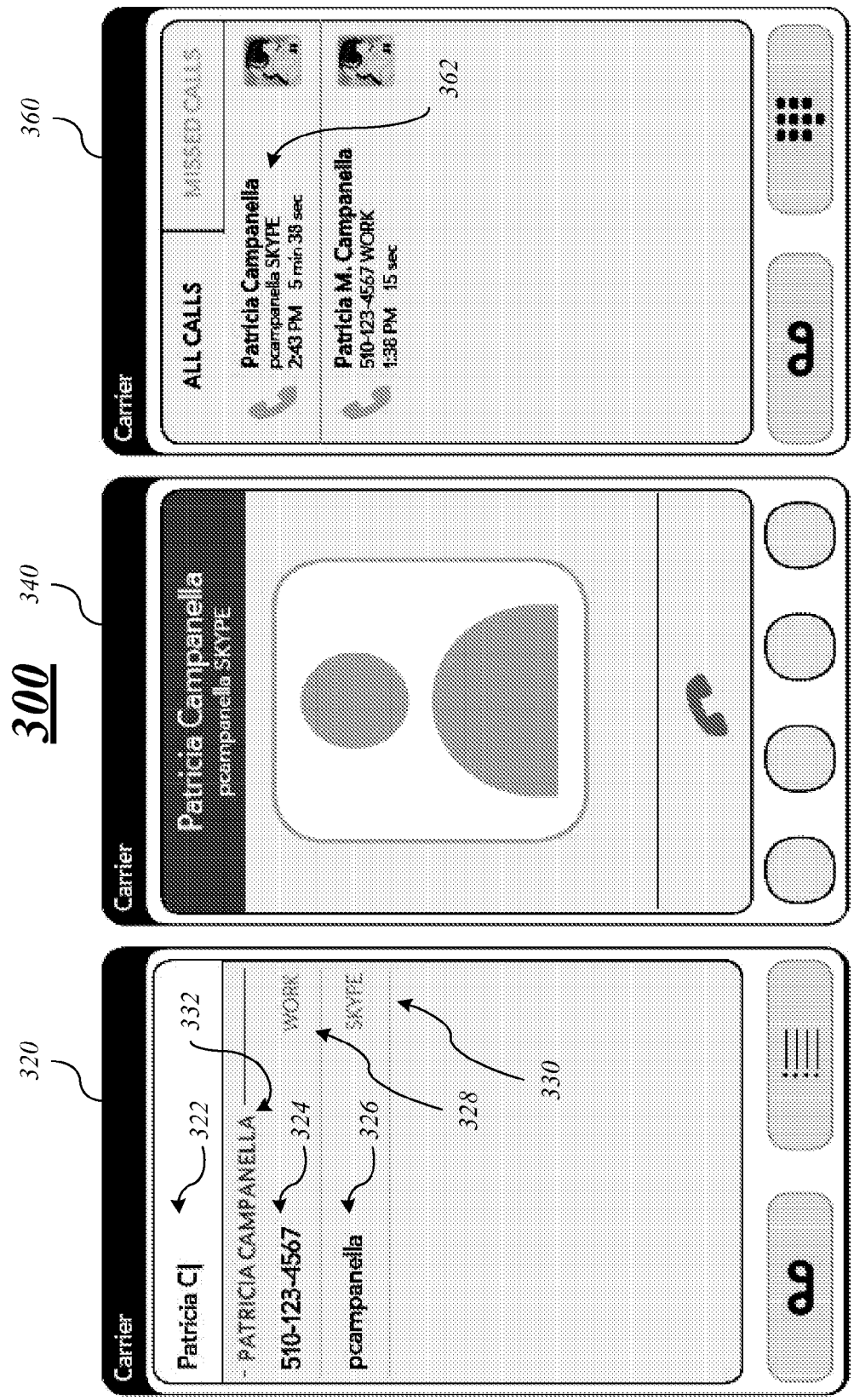
FIG. 3 illustrates one embodiment of a first user interface.

FIG. 3 illustrates a GUI view 300 of an integrated voice service GUI generated by the user interface 114 on behalf of the phone application 105-1 and/or the contact application 105-2. The GUI view 300 may display one or more display objects for a selected voice service by the integrated voice service graphical user interface. A display object may comprise any user interface element or GUI element used to display or represent information for a user, such as a name, number, identifier, label, icon, symbol, image, graphic, text, metadata, buttons, lists, graphs, charts, and so forth. The embodiments are not limited in this context. The GUI view 300 includes GUI views 320, 340 and 360.

In the illustrated embodiment shown in FIG. 3, for example, a user may launch the phone application 105-1 and begin typing in some form of a contact identifier using an input device (e.g., touchscreen keyboard or thumbboard). For instance, a GUI view 320 displays letters for the contact identifier of "Patricia C" in the display object 322 of the GUI view 320. As the letters for the contact identifier are entered into the mobile computing device 110, an addressing widget for the phone application 105-1 and/or the contact application 105-2 begins searching for any contact records matching the contact identifier. In this example, a contact record for "Patricia Campanella" as indicated by a display object 332 is found with two display objects 324, 326 having labels for two different contact identifiers. The display object 324 displays a contact identifier comprising a telephone number in a conventional International Telecommunication Union (ITU) E.164 standard format. The display object 328 displays metadata for the display object 324, which in this case is a word "WORK" indicating that the contact identifier shown by the display object 324 is a work telephone number for "Patricia Campanella." The display object 326 displays a contact identifier comprising a VOP contact identifier for a particular voice service platform 132-1-r, which in this case is a Skype voice service platform 132-2. As shown, the display object 326 displays "pcompanella" in the form of a Skype Identifier, and a label "SKYPE" is indicated by a display object 330.

If a user selects to call the contact identifier shown by display object 326, the VOP contact identifier is treated the same as any other phone number type (e.g., work, mobile) by the phone application 105-1 and associated widgets. For instance, a call log widget, an active call widget, and addressing widget for the phone application 105-1 all use the correct label for the VOP contact identifier, which in this case is "SKYPE." As with a conventional phone number, anywhere in the user interface dialog where the VOP contact identifier is referenced should have the appropriate contact identifier shown by the display object 330.

As shown in GUI view 340, a user may select the contact identifier shown by the display object 326 to initiate a communication session for a VOP telephone call using a voice service feature 134-1 of the VOP voice service platform 132-2. Since this is a unique contact identifier for the voice service feature 134-1 of the VOP voice service platform 132-2, the voice service manager 104 bypasses a voice service selection algorithm and attempts to establish the communication session using the voice service feature 134-1 of the VOP voice service platform 132-2.

As shown in a GUI view 360, once the call is completed, the call log widget may illustrate details about the completed telephone call in the form of a call record, as indicated by display object 362. The call record may include information indicating, among other things, that the call was established using the VOP voice service platform 132-2.

In some cases, the GUI view 320 may not list different contact identifiers for a given contact record, but may simply display a single contact identifier indicating a name for a call record, with the call record having multiple associated contact identifiers (e.g., hidden or shown). For instance, the GUI view 320 may be modified to display only the display object 332 for "Patricia Campanella" without the contact identifiers of display objects 324, 326. In this case, the display object 332 for "Patricia Campanella" represents a shared contact identifier. A user may select the display object 332 to initiate a telephone call without identifying a particular voice service platform 132-1-r, thereby leaving details about selecting and completing the telephone call using a particular voice service platform 132-1-r to the voice service manager 104.

In one embodiment, for example, the voice service manager 104 may receive the shared contact identifier represented by the display object 332, and initiate a voice service selection algorithm to select a particular voice service platform 132-1-r from the multiple voice service platforms 132-1-r. The voice service manager 104 may first discover and identify any contact identifiers associated with the shared contact identifier. This may be accomplished using the addressing widget. Continuing with our previous example, the shared contact identifier for "Patricia Campanella" includes two different contact identifiers shown by the display objects 324, 326 and representing two different voice service platforms 132-1, 132-2. The voice service manager 104 then selects one of the voice service platforms 132-1, 132-2 to establish a voice or data connection over a wireless communications channel via radio signals 120-1-m with one or more wireless resources 130-1-n.

In various embodiments, the voice service manager 104 may select a particular voice service platform 132-1-r from the multiple voice service platforms 132-1-r in accordance with one or more communication parameters and selection rules. Selection rules may comprise logic for selecting a voice service platform 132-1-r based on one or more communication parameters. Some examples of communication parameters may include without limitation a list of available voice services, a transmission quality parameter, a reliability parameter, a communication protocol, a device capability, a voice service feature, cost value, a power parameter, user preference, a location, a calling region, and so forth. Other examples of communication parameters may include without limitation a network scanning threshold parameter, a radio-frequency channel parameter, an access point parameter, a rate selection parameter, a frame size parameter, an aggregation size parameter, a packet retry limit parameter, a protocol parameter, a radio parameter, modulation and coding scheme (MCS), acknowledgement parameter, media access control (MAC) layer parameter, physical (PHY) layer parameter, and any other communication parameters affecting operations for a radio implemented by the mobile computing device 110. The embodiments are not limited in this context.

A particular set of selection rules implemented for the voice service manager 104 may vary as desired for a given set of design considerations and performance parameters. The selection rules may include default rules established by a manufacturer, selectable rules from a voice service platform, user preferences, and so forth.

One example of a selection rule may comprise selecting a particular voice service platform 132-1-r based on current or available connections provided by one or more radios 116-1-q of the radio module 106. The voice service manager 104 may query the radio module 106 (e.g., via the radio manager 107) to retrieve a list of available voice service platforms 132-1-*r* within transmission range of the radios 116-1-*q* implemented for the radio module 106. For instance, assume the radio module 106 includes a cellular radio 116-1, an EVDO radio 116-2, and a WiFi radio 116-3. The voice service manager 104 may query the radio module 106 for RSSI measurements for each radio 116-1, 116-2, 116-3. An RSSI is typically a measurement of the power present in a received radio signal in arbitrary units. The RSSI may provide an indication of how much information may be communicated between devices. Typically a lower RSSI implies lower information rates or quality, while a higher RSSI implies higher information rates or quality. The RSSI measurements may be made by the radio manager 107, for example. The voice service manager 104 may compare and evaluate the RSSI measurements for each of the radios 116-1, 116-2, 116-3, identify one of the radios 116-1, 116-2 or 116-3 as currently providing a highest quality level, and select a voice service platform 132-1-*r* accessible via the identified radio 116-1, 116-2 or 116-3.

Another example of a selection rule may comprise selecting a voice service platform 132-1-*r* based on particular device capabilities for the mobile computing device 110 and/or a receiving device (e.g., electronic device 138-1-*d*). For instance, the voice service manager 104 may attempt to determine whether the mobile computing device 110 and the receiving device utilize a common radio from the radio module 106. A common radio may ensure compatibility of communication protocols, which reduces a number of intermediate nodes needed to complete a call connection (e.g., access points, gateways, protocol converters, etc.), thereby decreasing latency and increasing quality. A common radio may also ensure a match in connection quality and speeds. In another example, the voice service manager 104 may attempt to determine whether the mobile computing device 110 and the receiving device utilize a same or similar voice coder/decoder (codec), modulation and coding scheme (MCS), or any other communication parameters affecting operations for a radio implemented by the mobile computing device 110 and the receiving device.

Another example of a selection rule may comprise selecting a voice service platform 132-1-*r* based on a particular set of voice services or attributes implemented for the mobile computing device 110 and/or a receiving device (e.g., electronic device 138-1-*d*). For instance, the voice service manager 104 may attempt to determine whether the mobile computing device 110 and the receiving device utilize a common voice service platform 132-1-*r*. A common voice service platform 132-1-*r* may reduce a number of intermediate nodes needed to complete a call connection (e.g., access points, gateways, protocol converters, etc.), thereby decreasing latency and increasing quality. A common voice service platform 132-1-*r* may also ensure common service features 134-1-*s* are available to both the mobile computing device 110 and the receiving device (e.g., an electronic device 138-1-*d*). In those cases where a common voice service platform 132-1-*r* is not available, the voice service manager 104 may compare voice service features available between non-common voice service platforms 132-1-*r*, and select a voice service platform 132-1-*r* for each of the mobile computing device 110 and the receiving device (e.g., an electronic device 138-1-*d*) providing a highest matching set of features or matched priority features.

Other examples for selection rules may include selecting a voice service platform 132-1-*r* based on lowest cost factoring in a region for a called party (e.g., local, long distance or international), selecting a voice service platform 132-1-*r* based on a current or future location for the mobile computing device 110 (e.g., using a global positioning satellite (GPS), triangulation or other location technique), and selecting a voice service platform 132-1-*r* based on a set of user preferences or attributes manually set by a user. For instance, a user may prefer to always use a lowest cost provider, a most reliable provider, a highest QoS provider, and so forth. It may be appreciated that these are merely a few examples of selection rules and communication parameters, and any number of selection rules and communication parameters may be implemented as desired for a given set of voice service platforms 132-1-*r*.

Once the voice service manager 104 selects a particular voice service platform 132-1-*r*, the voice service manager may send a control directive to the phone application 105-1 and/or the radio module 106 to establish a voice or data connection over a wireless communications channel using the selected voice service platform 132-1-*r*, and follows conventional set-up and tear-down operations for establishing the voice or data connection.

In various embodiments, the voice service manager 104 may establish a voice or data connection over a wireless communications channel using the selected voice service platform 132-1-*r* using a corresponding software application associated with a selected voice service platform 132-1-*r*. In some cases, a given voice service platform 132-1-*r* may need a separate software application or widget to launch the corresponding voice service platform 132-1-*r*. In such cases, the voice service manager 104 may be arranged to launch the corresponding software application, which in turn will prompt a user to manually enter login information and/or security credentials to access the voice service platform 132-1-*r*. This provides a benefit of compatibility with legacy devices and voice service platforms 132-1-*r*, at a cost of manual operations required by a user.

In various embodiments, the voice service manager 104 may establish a voice or data connection over a wireless communications channel using the selected voice service platform 132-1-*r* using a corresponding application program interface (API) associated with a selected voice service platform 132-1-*r*. In this case, an API may be called by the voice service manager 104 to access a selected voice service platform 132-1-*r*, and the voice service manager 104 may automatically pass login information and/or security credentials for a user to the selected voice service platform 132-1-*r*. This provides a benefit of automation (e.g., reduced or eliminated user intervention), at a cost of implementing the APIs with legacy devices.

Figure 4:
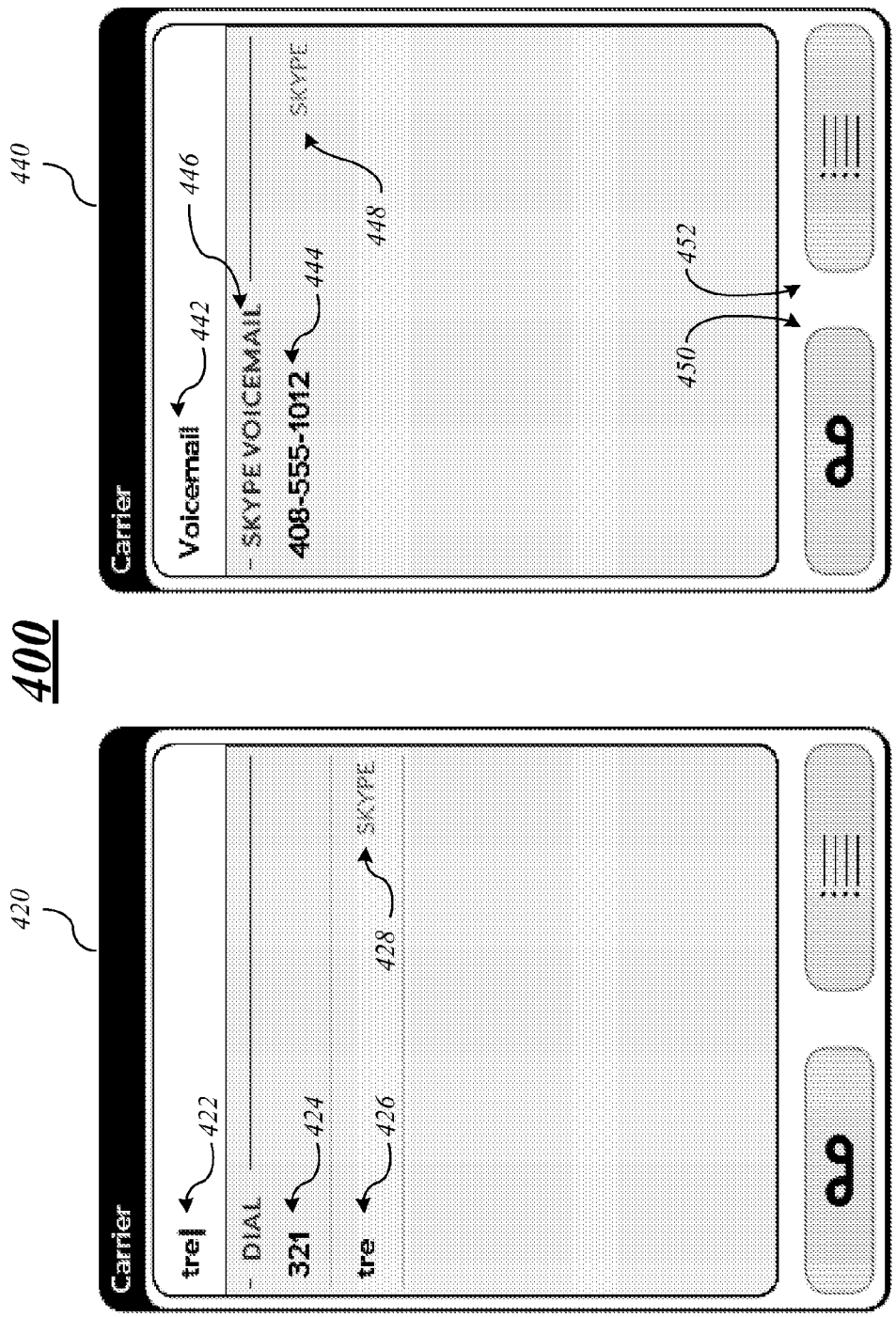
FIG. 4 illustrates one embodiment of a second user interface.

FIG. 4 illustrates a GUI view 400 of an integrated voice service GUI generated by the user interface 114 on behalf of the phone application 105-1 and/or the contact application 105-2. The GUI view 400 includes GUI views 420, 440.

Similar to a user dialing a contact or a phone number from an addressing widget for the phone application 105-1, a user can also directly dial a VOP contact identifier (e.g., user name) for a VOP voice service platform 132-1-*r*. For example, a GUI view 420 illustrates a user entering the characters "tre" into an input device, with the characters displayed by a display object 422. A display object 424 displays the numerical equivalents to the letters "tre" as "321." A display object 426 displays a VOP contact identifier "tre" having a "SKYPE" display object 428.

The GUI view 440 illustrates that a user can also dial "Voicemail" to access any voicemail service features for available voice service platforms 132-1-*r*. In the illustrated embodiment shown in the GUI view 440, a display object 442 displays a label "Voicemail," which has an associated display object 444 displaying "408-555-1012." The telephone number "408-555-1012" is a telephone number for accessing "SKYPE VOICEMAIL" as indicated by a display object 446, as well as a display object 448 having the label "SKYPE." In the case of multiple VOP voice service platforms 132-1-r implemented by the mobile computing device 110, additional display objects may be used for displaying access numbers for voicemail service features 134-2 for each of the implemented VOP voice service platforms 132-1-r. An access number for a particular voicemail service feature 134-2 of a given VOP voice service platform 132-1-r may be optionally programmed into a set voicemail button 450, a call list button 452, or a speed dial number. The embodiments are not limited in this context.

Figure 5:
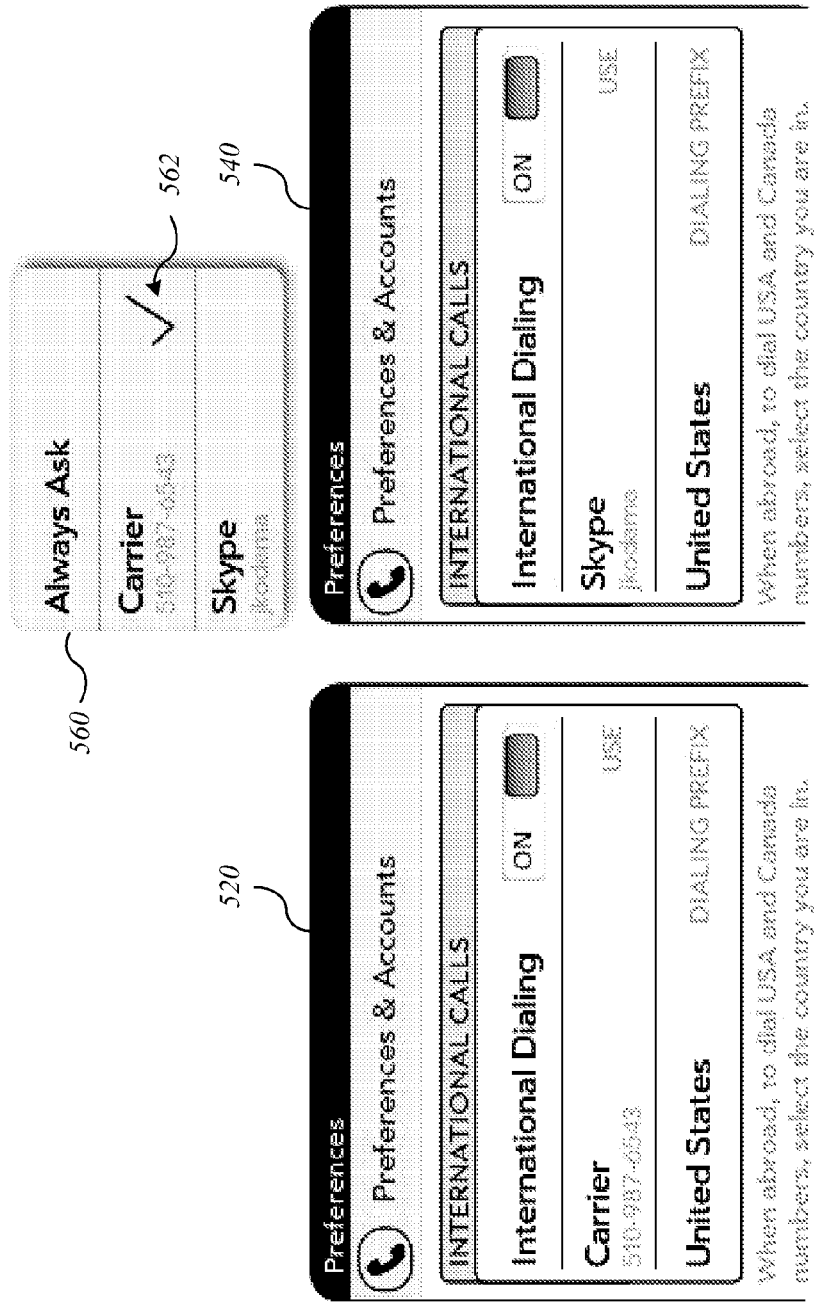
FIG. 5 illustrates one embodiment of a third user interface.

FIG. 5 illustrates a GUI view 500 of an integrated voice service GUI generated by the user interface 114 on behalf of the phone application 105-1 and/or the contact application 105-2. The GUI view 500 includes GUI views 520, 540 and 560.

As with other aspects of the phone application 105-1, preferences for the various voice service features for a VOP voice service platform 132-1-r may be set via the user interface 114. For instance, the GUI views 520, 540 illustrate display objects for setting preferences for the Skype VOP voice service platform 132-1, including international dialing, contact identifiers and United States dialing prefixes, among other preferences. The GUI view 560 illustrates display objects displaying preference options for "Always Ask," "Carrier" and "Skype," with a display object 562 illustrating an icon for a check mark indicating a specific carrier number is a default for international calls.

Figure 6:
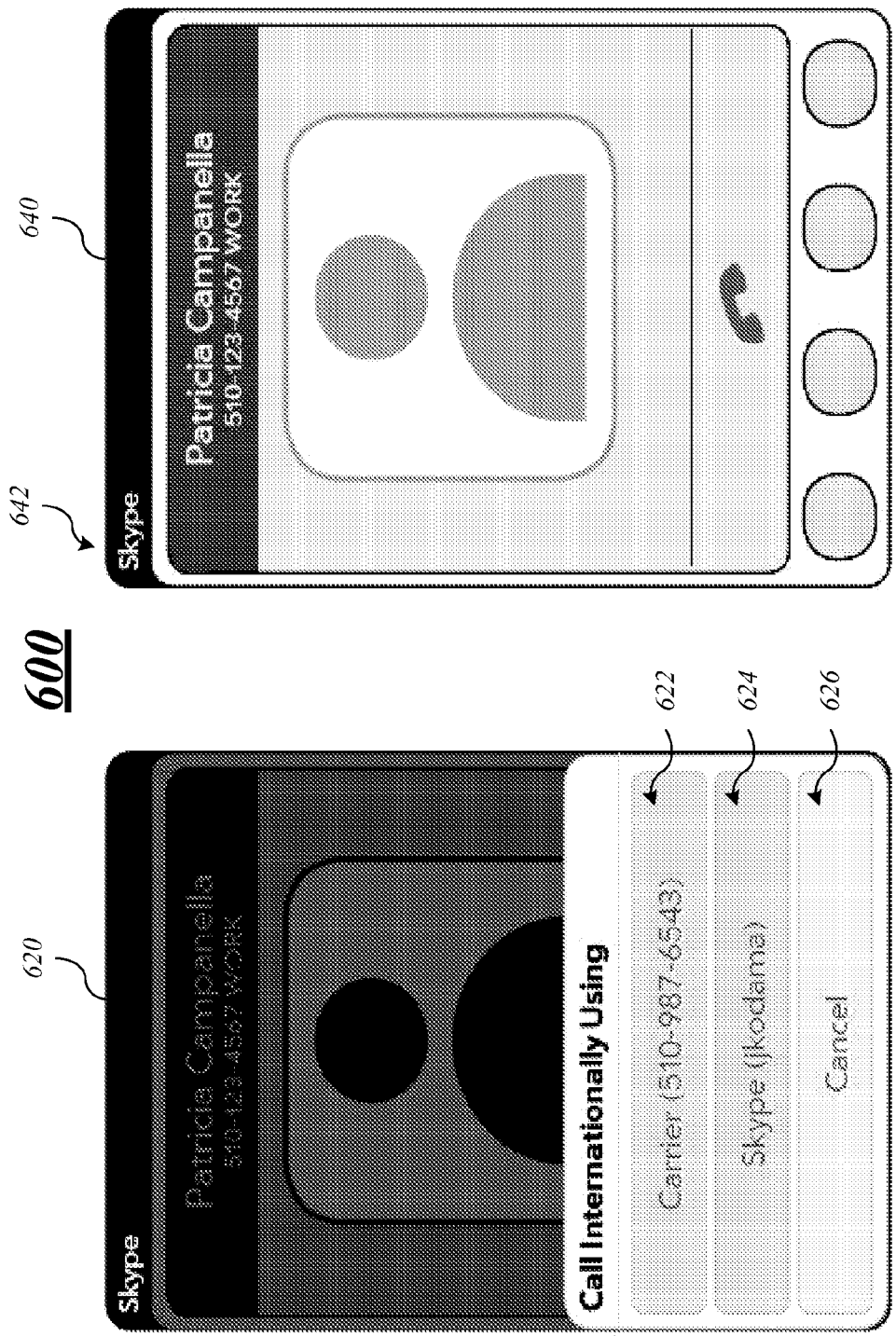
FIG. 6 illustrates one embodiment of a fourth user interface.

FIG. 6 illustrates a GUI view 600 of an integrated voice service GUI generated by the user interface 114 on behalf of the phone application 105-1 and/or the contact application 105-2. The GUI view 600 includes GUI views 620, 640.

The GUI view 600 illustrates a use scenario when a user initiates an international call. The GUI view 602 illustrates a scenario where the user taps to dial an international call, and prior to dialing, prompts the user to select which voice service platform 132-1-r to use via display objects 622, 624 and 626 showing respective labels "Carrier (510-987-6543)," "Skype (jkodama)" and "Cancel." When a user selects the display object 624 to make an international call to "Patricia Campanella," a display object 642 displays a label for "Skype" during the call to indicate the carrier for the international call.

FIG. 7 illustrates a GUI view 700 of an integrated voice service GUI generated by the user interface 114 on behalf of the phone application 105-1 and/or the contact application 105-2. The GUI view 700 includes GUI views 720, 740.

The GUI view 700 illustrates a use scenario for a user to manage credit balances associated with a given VOP voice service platform 132-1-r, such as the VOP voice service platform 132-2. The GUI view 720 illustrates a dial pad for the phone application 105-1 with menu items associated with various settings for the phone application 105-1. When a user selects a display object 722 labeled "Preferences & Accounts," the GUI view 740 appears with various display objects and associated labels, including a groupbox display object 742 with a label "Accounts." Whenever a Skype account has been created, the groupbox display object 742 shows a display object 744 for the VOP voice service platform 132-2. The display object 744 shows an icon for Skype, a label "Skype," and a Skype contact identifier (e.g., an email address and/or user name). Tapping on the display object 744 opens an accounts page, as illustrated in FIG. 8.

Figure 8:
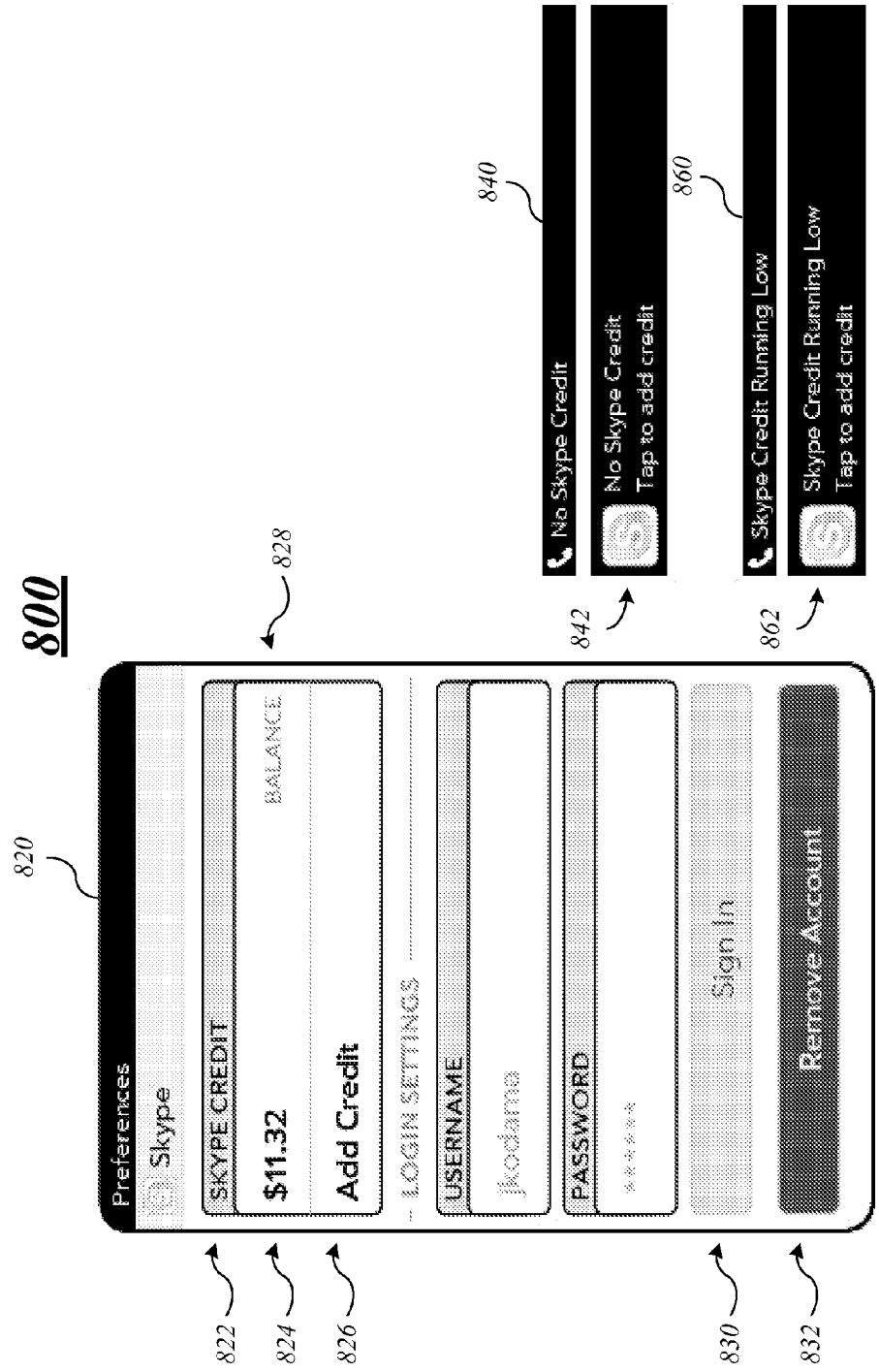
FIG. 8 illustrates one embodiment of a sixth user interface.

FIG. 8 illustrates a GUI view 800 of an integrated voice service GUI generated by the user interface 114 on behalf of the phone application 105-1 and/or the contact application 105-2. The GUI view 800 includes GUI views 820, 840 and 860.

The GUI view 800 represents an account page for a Skype account associated with the voice service feature 134-1 of the VOP voice service platform 132-2. The GUI view 820 illustrates a display object 822 indicating a "SKYPE CREDIT" and a display object 824 indicating an amount of "$11.32" which is labeled "BALANCE" by a display object 828. The GUI view 820 also illustrates a display object 826 with a label "Add Credit" to provide a user a capability of adding credit to the VOP voice service platform 132-2. Other display objects 830, 832 labeled respectively "Sign In" and "Remove Account" may be used to edit login settings or remove the account from this screen. Tapping the display object 826 to "Add Credit" will launch a Skype browser page that will allow the user to add credit to his/her account.

The GUI views 840, 860 indicate a no credit or low credit scenario for the user. For instance, the GUI view 840 shows a display object 842 indicating "No Skype Credit" and "Tap to add credit." The GUI view 860 shows a display object 862 indicating "Skype Credit Running Low" and "Tap to add credit." Such banner and dashboard notifications appear when Skype credit is running low or has run out. These notifications may be limited, such as displaying only once per power cycle, for example.

In addition to the voice service manager 104 and/or the user interface 114 providing various GUI views integrating voice service management features with the phone application 105-1, the voice service manager 104 and/or the user interface 114 may provide various GUI views integrating voice service management features with the contact application 105-2.

Figure 9:
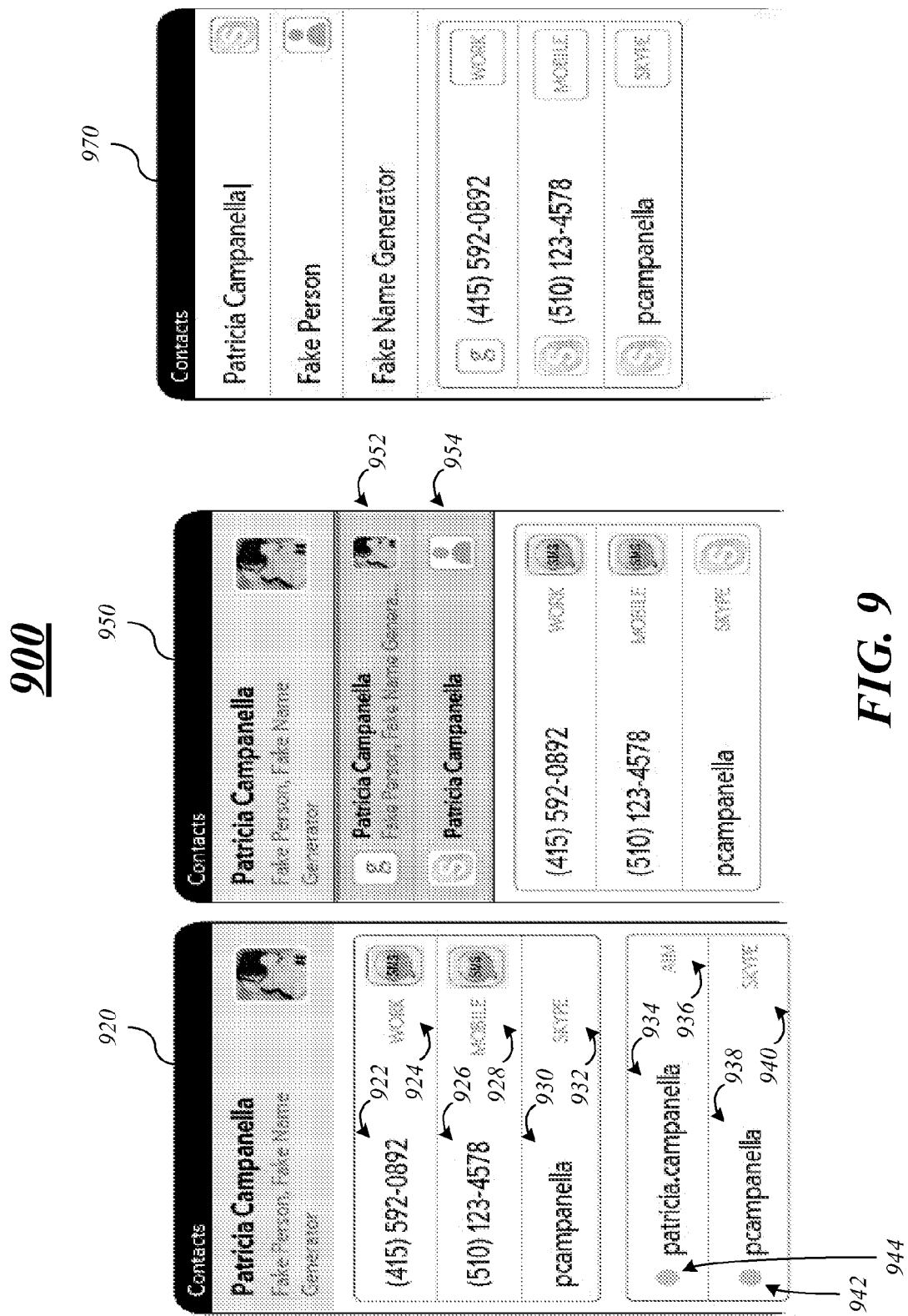
FIG. 9 illustrates one embodiment of a seventh user interface.

FIG. 9 illustrates a GUI view 900 of an integrated voice service GUI generated by the user interface 114 on behalf of the contact application 105-2. The GUI view 900 includes GUI views 920, 950 and 970.

The GUI view 900 illustrates examples of integrating various service features 134-1-s for a VOP voice service platform 132-1-r into a unified contact record. The GUI view 900 illustrates various display objects for contact information, contact identifiers, and any other information suitable for a contact record for a given contact, such as "Patricia Campanella," for example. Contact information for any of the service features 134-1-s of the voice service platforms 132-1-r, particularly for VOP services, may be incorporated into a contact record similar to other contact identifiers (e.g., a cellular carrier). Examples of contact information for VOP voice services may include without limitation user data, such as login information and security credentials for online VOP services. Other examples may include VOP service providers, presence information, context information, pictures, and so forth. Such contact information may be added or integrated for a contact record of a given contact in a manner similar to other traditional types of contact information (e.g., work telephone number, mobile telephone number, address, etc.). Fields for a given service feature 134-1-s of a given VOP voice service platform 132-1-r may be added to an existing contact record as needed.

As shown, the GUI view 920 includes display objects 922, 924 for a contact identifier "(415) 592-0892" and label "WORK," display objects 926, 928 for a contact identifier "(510) 123-4578" and label "MOBILE," and display objects 930, 932 for a contact identifier "pcampanella" and label "SKYPE." The GUI view 920 also illustrates various display objects for contact identifiers associated with certain voice service platforms 132-1-r, and presence indicators for each of the voice service platforms 132-1-r. As shown, the GUI view 920 includes display objects 934, 936 for a contact identifier "patricia.campanella" and an IM service feature 134-2 for a voice service platform 132-3 labeled "AIM," and display objects 938, 940 for a contact identifier "pcampanella" and an IM service feature 134-2 for the VOP voice service platform 132-2 labeled "SKYPE." The GUI view 920 also includes display objects 942, 944 with presence icons that change color or shape to indicate whether "Patricia Campanella" is online or offline for each of the voice service platforms 132-2, 202-3.

The GUI view 950 includes information similar to display objects 922-932 of the GUI view 920. In addition, the GUI view 950 includes different views of VOP voice service platforms 132-1-r available for "Patricia Campanella," including display objects 952, 954 with contact identifiers, photos and logos for Google Voice and Skype.

The GUI view 970 provides another example that contact information for various service features 134-1-s for any VOP voice service platforms 132-1-r can be readily integrated with conventional contact information. For instance, when a user types "Patricia Campanella" into an input device, contact identifiers for any VOP voice service platforms 132-1-r are listed as conventional contact identifiers.

Figure 10:
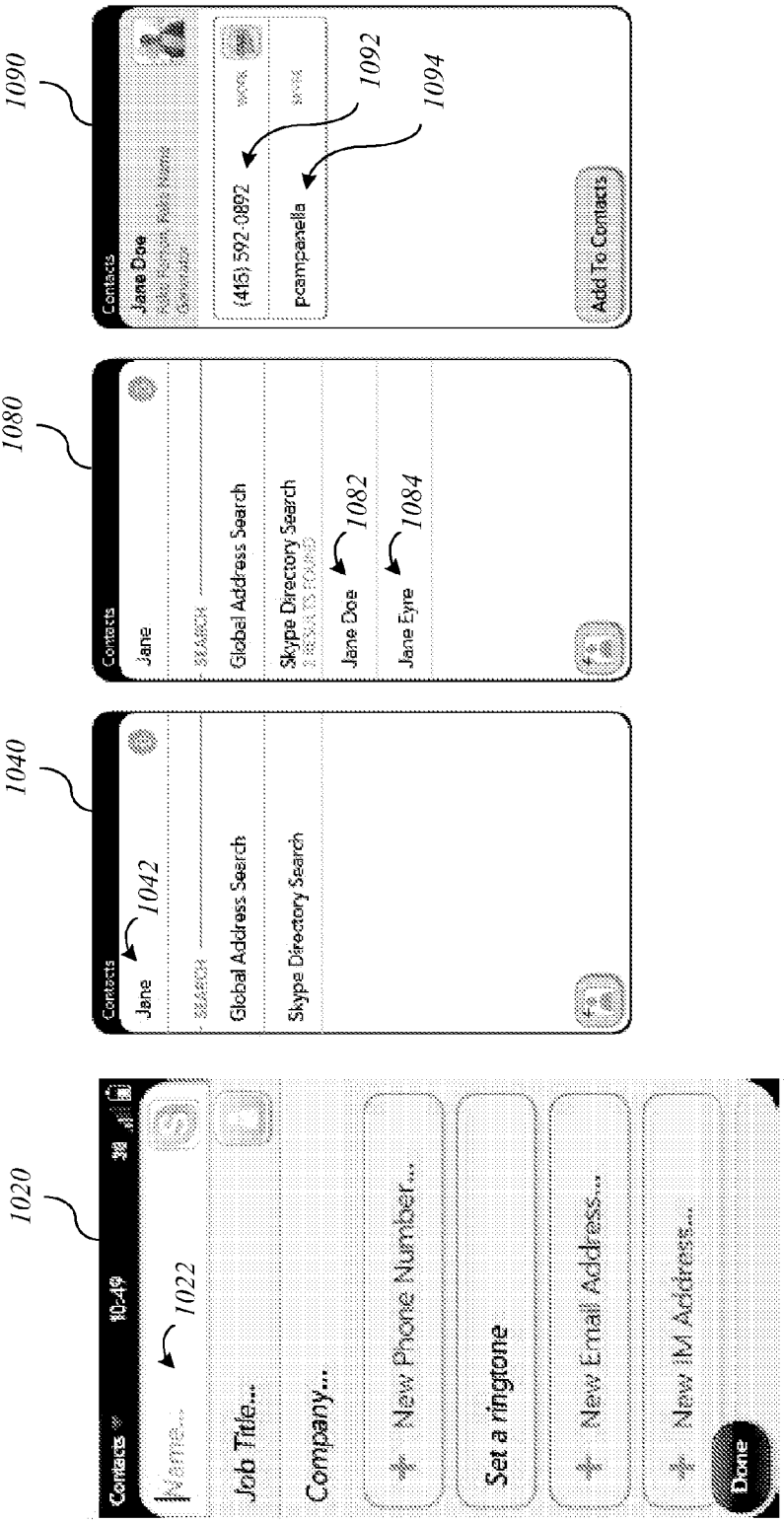
FIG. 10 illustrates one embodiment of an eighth user interface.

FIG. 10 illustrates a GUI view 1000 of an integrated voice service GUI generated by the user interface 114 on behalf of the contact application 105-2. The GUI view 1000 includes GUI views 1020, 1040, 1080 and 1090.

The GUI view 1020 provides an example of adding a contact record with VOP contact information from within the contact application 105-2. As with contact information from the carrier voice service platform 132-1, contact information for the VOP voice service platform 132-2 may be added in a similar manner. For instance, a user may tap a "New Contact" command menu button and then select Skype from the list of account types.

The GUI views 1040, 1080 and 1090 provide examples of using an address widget to search for contact records including VOP contact information from a VOP directory (e.g., Skype directory) within the contact application 105-2. In some cases, the VOP contact information in the VOP directory may be retrieved from a remote device, such as web server, for example. The GUI view 1020 shows a home view for the contact application 105-2 with a display object 1022 for entering a contact identifier (e.g., name, identifier, email address, etc.) for a universal search. The GUI view 1020 shows a display object 1042 where a first name "Jane" has been entered by an input device for the mobile computing device 110. A user then taps the search to execute. The GUI view 1080 shows results for the search, including display objects 1082, 1084 with two contact identifiers "Jane Doe" and "Jane Eyre" for the VOP voice service platform 132-2 that match the first name "Jane." Tapping one of the display objects 1082, 1084 will show that person's contact information. The GUI view 1080 shows display objects 1092, 1094 with two contact identifiers "(415) 592-0892" and "pcampanella," the latter comprising a VOP contact identifier.

Voicemail Service Features

In various embodiments, the voice service manager 104 and the phone application 105-1 and/or the contact application 105-2 may interoperate to manage access and use of any of the voice service platforms 132-1-r and associated service features 134-1-s. In one embodiment, the voice service manager 104 may receive one or both control directives 206-1, 206-2 to initiate voicemail service features 134-2 provided by one of the multiple voice service platforms 132-1-r. The control directives 206-1, 206-2 may contain a unique contact identifier or a shared contact identifier.

In the case of a unique contact identifier, the voice service manager 104 selects the voicemail service feature 134-2 indicated by the unique contact identifier. For instance, the voice service manager 104 may receive the control directive 206-2 from the contact application 105-2 with a unique contact identifier for a specific voicemail service feature 134-2 for the VOP voice service platform 132-2 (e.g., "Skype Voicemail"). In this case, the voice service manager 104 selects the voicemail service feature 134-2 for the VOP voice service platform 132-2, and connects with the specific voicemail system provided by the VOP voice service platform 132-2.

In the case of a shared contact identifier, the voice service manager 104 may select a voicemail service feature 134-2 from one or more of the multiple voice service platforms 132-1-r. For instance, assume that a user wants to check all voicemail service features for all voice service platforms 132-1-r using a single command. The voice service manager 104 may receive the control directive 206-2 from the contact application 105-2 with a shared contact identifier for two or more voicemail service features corresponding to two or more voice service platforms 132-1-r. In this case, a voicemail service selection algorithm similar to the voice service selection algorithm may be executed by the voice service manager 104.

Upon execution of the voicemail service selection algorithm, the voice service manager 104 may first discover and identify any contact identifiers associated with the shared contact identifier. This may be accomplished using the addressing widget. The voice service manager 104 may then select one or more of voicemail service features 134-2 of the voice service platforms 132-1-r corresponding to the discovered contact identifiers in accordance with one or more communication parameters and selection rules. Similar to the voice service selection rules, the voicemail selection rules may comprise logic for selecting a voicemail service feature 134-2 of a corresponding voice service platform 132-1-r based on one or more communication parameters. For instance, the communication parameter may be some measure of network connectivity, such as RSSI measurements from the radio manager 107 of the radio module 106.

Once selected, the voice service manager 104 may then attempt to automatically establish a voicemail communication session with another device (e.g., with or through a wireless resource 130-1-n) over a wireless communications channel 120-1-m for each of the selected voicemail service features of the voice service platforms 132-1-r. The voice service manager 104 may accomplish this by automatically providing login information and security credentials needed for each voicemail service feature of the voice service platforms 132-1-r in accordance with corresponding login and authentication operations. Each voicemail service feature 134-2 may be accessed in sequence or in parallel. The latter case may be based on a given voice service platform 132-1-r, available radios of the radio module 106, radio co-existence factors, power requirements, and other operational parameters for the mobile computing device 110.

For each of the selected voicemail service features of the voice service platforms 132-1-r, a user may retrieve and manage voicemails for the selected voicemail service feature 134-2 per conventional techniques. For example, a user may retrieve voicemail messages, listen to each voicemail message in temporal sequence, skip voicemail messages, store voicemail messages, forward voicemail messages, delete voicemail messages, and so forth.

Additionally or alternatively, the voice service manager 104 may automatically retrieve and store voicemails from the VOP voice service platform 132-2 on the mobile computing device 110. For instance, this may be accomplished using the message application 105-3. In some cases, the voicemails may be stored in a native audio format. In such cases, the voicemails may be presented by as visual voicemail. Visual voicemail is the technique of adding a visual aspect to phone voicemail such as allowing users to view a list of audio voicemail entries or even read transcripts of these voicemail as text. These voicemails are converted to text by use of advanced speech recognition software or SST system, such as Dragon powered by Nuance Communications, Inc., Burlington, Mass. When voicemail messages may be converted from audio files to another form of media, such as text sequences generated by a STT system, the text versions of the converted voicemail messages may be managed by the message application 105-3 as any other text message, such as an email message, IM message, SMS message, MMS message, and so forth.

When voicemail messages arrive from a given voice service platform 132-1-r, the voice service manager 104 translates a list of available voicemail parameters to those supported by the mobile computing device 110 or as determined by an operating system, user parameters, default parameters, or the user interface 114. Examples of voicemail parameters may include without limitation extra data associated with voice mail messages, recording parameters, transcription parameters, priority parameters, presentation or style parameters, size of file attachments, and so forth. Examples of extra data associated with voice mail messages may include contact name, phone number, recordings, transcriptions, priorities, callback number, file attachments, and so forth. In one embodiment, the voice service manager 104 may translate voicemail parameters to a desired user interface presentation style as determined by an operating system, user parameters, default parameters, or the user interface 114. For example, if a particular voice service platform 132-1-r provides 5 levels of priority but the user interface 114 only supports 3 levels of priority, presentation of priority levels will be translated to those supported by the mobile computing device 110. It may be appreciated that any number of voicemail parameters and translation techniques may be used as desired for a given implementation, and the embodiments are not limited in this context.

Message Services

In various embodiments, the voice service manager 104 may be operative to receive a control directive 206-3 to initiate message service features 134-3 associated with one of the multiple voice service platforms 132-1-r, select a message service feature 134-3 associated with one of the multiple voice service platforms 132-1-r, and establish a message session for the selected message service 134-3. This may be accomplished using one or more GUIs provided by the user interface 114 via one or more control directives 206-4, examples of which are provided in FIGS. 11-15.

Figure 11:
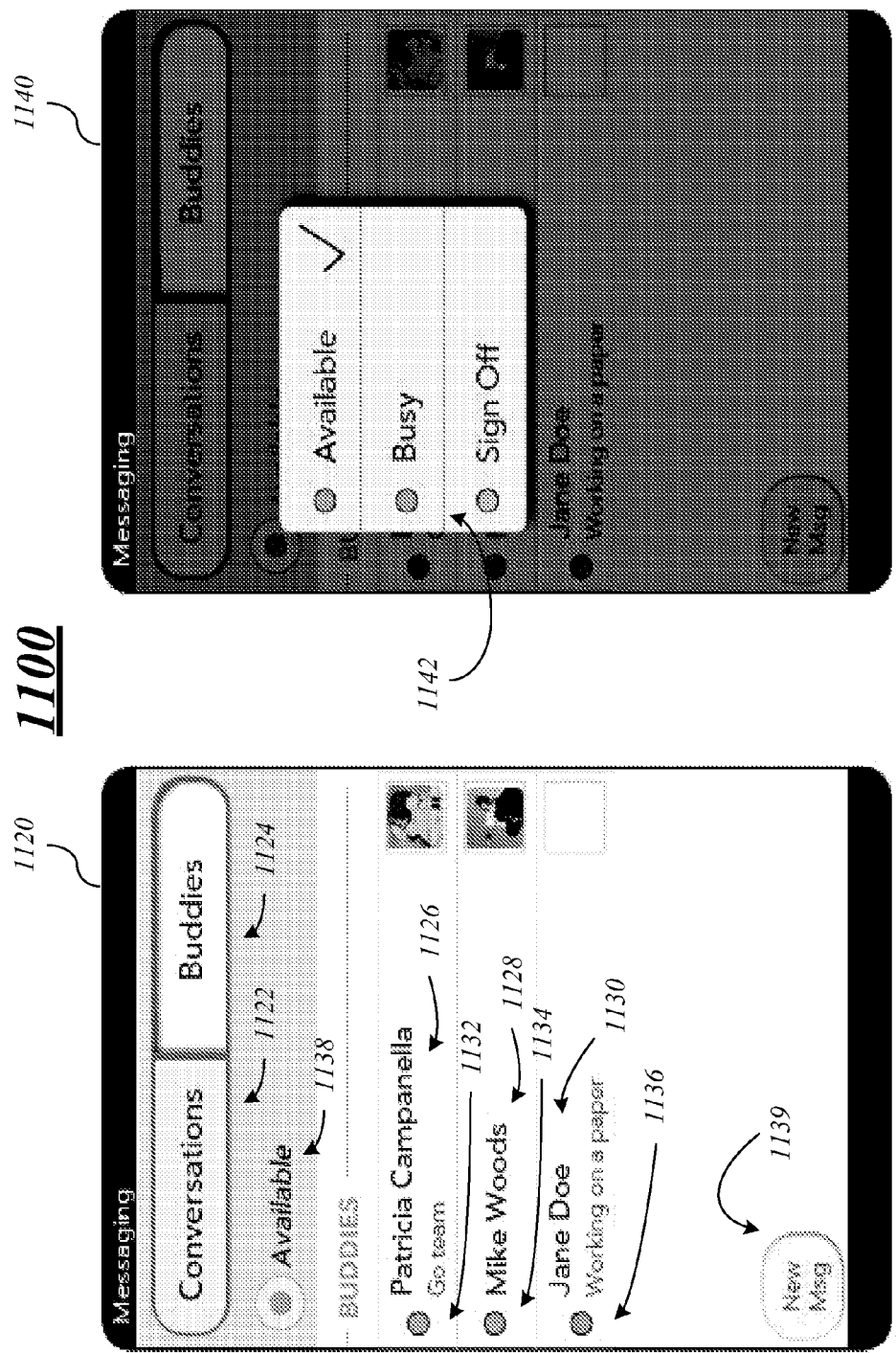
FIG. 11 illustrates one embodiment of a ninth user interface.

FIG. 11 illustrates a GUI view 1100 of an integrated voice service GUI generated by the user interface 114 on behalf of the message application 105-3. The GUI view 1100 includes GUI views 1120, 1140.

The GUI view 1120 provides an example of a display object 1122 labeled "Conversations" for listing conversations and a display object 1124 labeled "Buddies" for listing friends or contacts. As shown, the GUI view 1120 illustrates activation of the display object 1124 to provide a buddy list including display objects 1126, 1128 and 1130 having respective labels "Patricia Campanella," "Mike Woods" and "Jane Doe." A display object 1139 labeled "New Msg" can be activated to begin communicating messages with a receiving device using one of the available message modalities or transports provided by the message application 105-3.

Further, the GUI view 1120 may include presence information using display objects 1132, 1134, 1136 and 1138. In computer and telecommunications networks, presence information is a status indicator that conveys ability and willingness of a potential communication partner, such as a user, to communicate. A user's client provides presence information (presence state) via a network connection to a presence service, which is stored in what constitutes a personal availability record (called a presentity) and can be made available for distribution to other users (called watchers) to convey his/her availability for communication. Presence information has wide application in many communication services and is one of the innovations driving the popularity of instant messaging or recent implementations of VOP clients. For instance, when display objects 1132, 1134, 1136 and/or 1138 are "green" then a user of the mobile computing device 110 is available to communicate. When "orange" the user may be unavailable.

The GUI views 1120, 1140 allow a user to change presence information for a user of the mobile computing device 110. As shown by the GUI view 1140, tapping a presence button may bring up various options shown by a display object 1142. Tapping one of the displayed options will change one or more message transports to a desired presence state.

Figure 12:
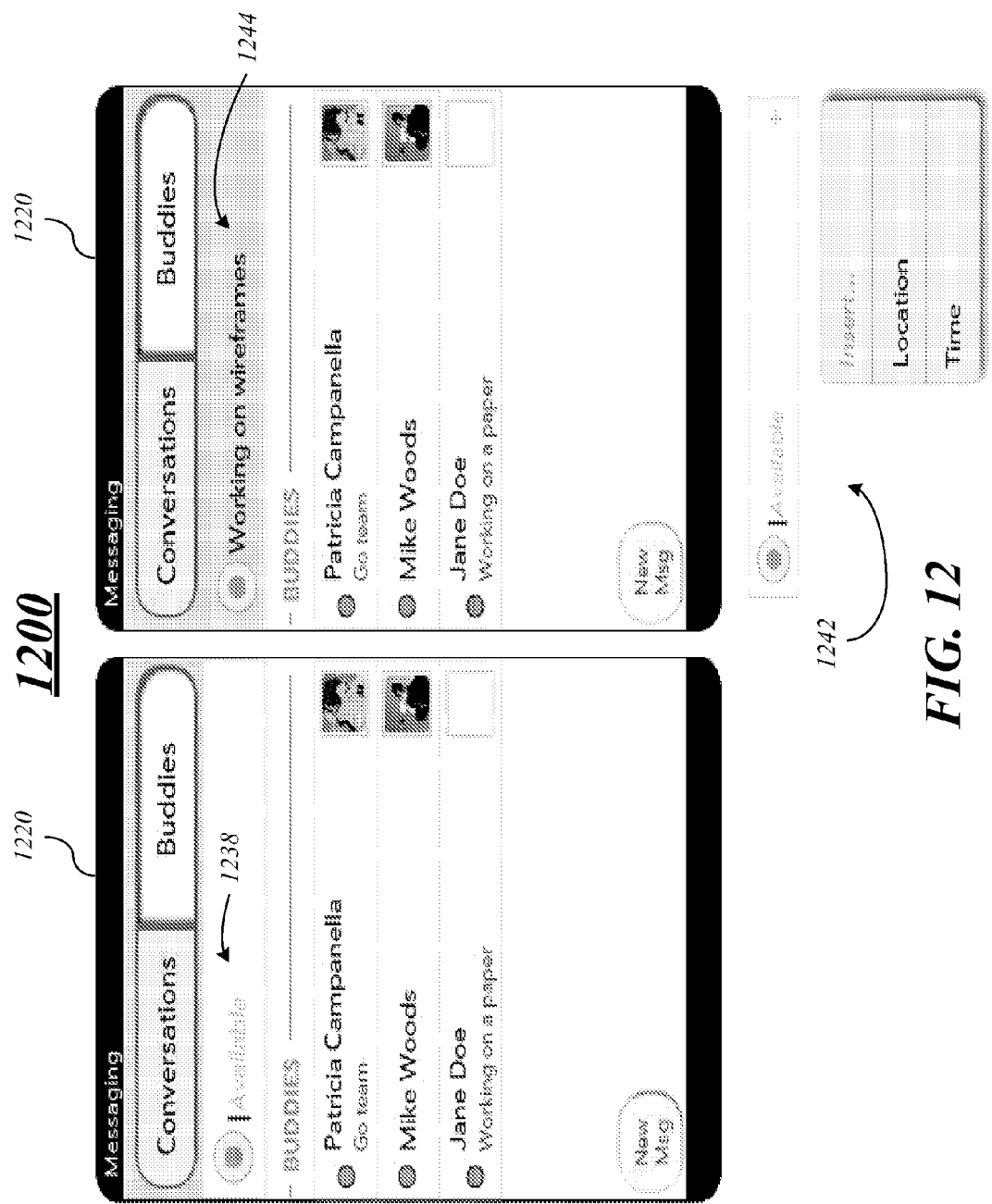
FIG. 12 illustrates one embodiment of a tenth user interface.

FIG. 12 illustrates a GUI view 1200 of an integrated voice service GUI generated by the user interface 114 on behalf of the message application 105-3. The GUI view 1200 includes GUI views 1220, 1240.

The GUI views 1220, 1240 allow a user to create and edit custom messages associated with a current presence state (e.g., "Working on a paper"). The GUI views 1220, 1240 may comprise display objects similar to the GUI view 1120. A custom message for a user of the mobile computing device 110 may be changed by tapping the text area next to a presence icon provided by a display object 1238. The text area turns into a text field into which the user can type information. Once the custom message is finished, the custom message appears in place of the previous text as indicated by a display object 1244 shown by the GUI view 1240. Tapping the text area may also bring up other presence information options, such as adding location information or time information to displayed presence information, among other types of information, as shown by a display object 1242 of the GUI view 1240.

Figure 13:
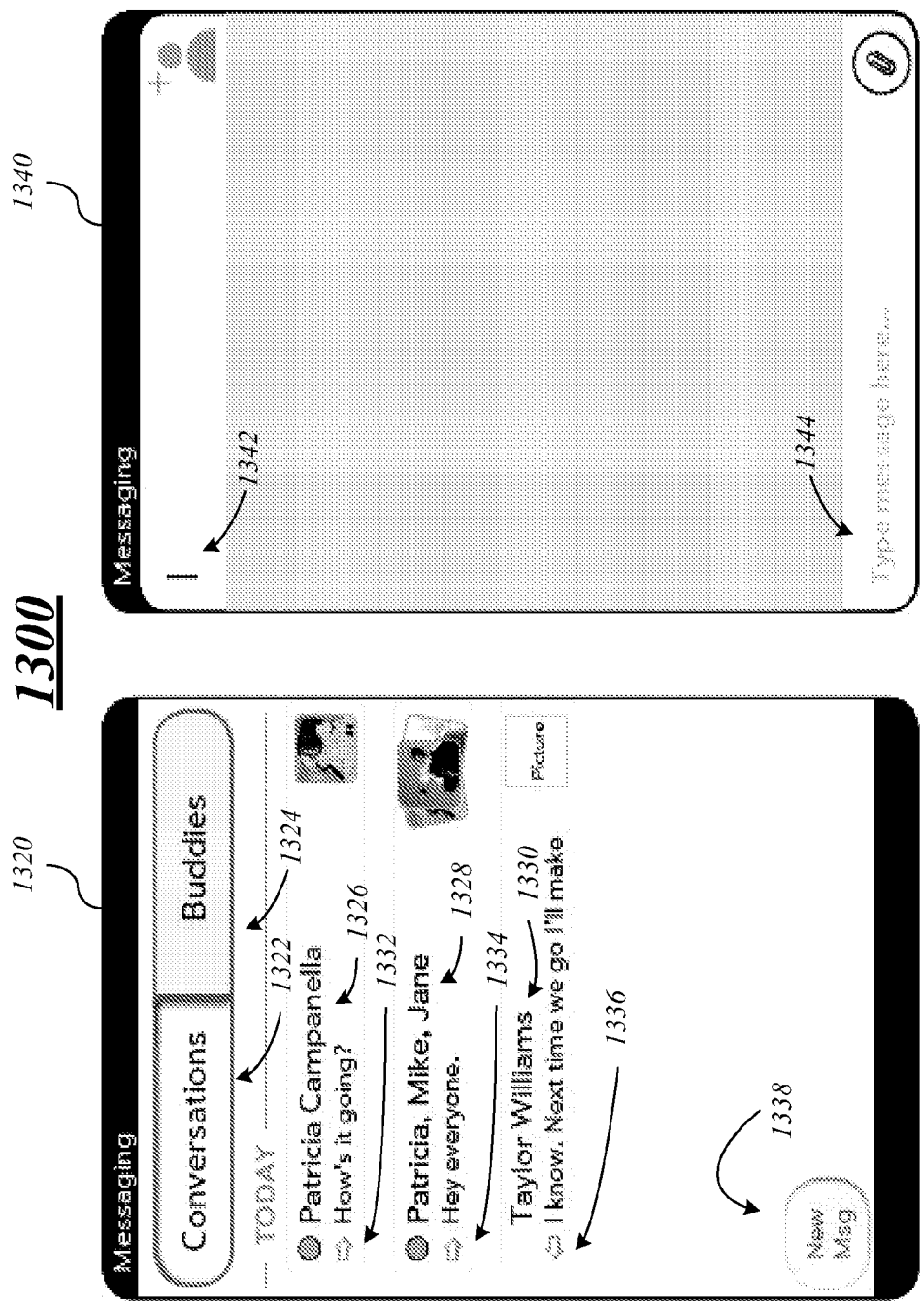
FIG. 13 illustrates one embodiment of an eleventh user interface.

FIG. 13 illustrates a GUI view 1300 of an integrated voice service GUI generated by the user interface 114 on behalf of the message application 105-3. The GUI view 1300 includes GUI views 1320, 1340.

The GUI view 1320 provides an example of a display object 1322 labeled "Conversations" for listing conversations and a display object 1324 labeled "Buddies" for listing friends or contacts. As shown, the GUI view 1320 illustrates activation of the display object 1322 to provide a conversation list including display objects 1326, 1328 and 1330 having respective labels "Patricia Campanella," "Patricia, Mike, Jane" and "Taylor Williams." The conversation list shows both group conversations and single person conversations. Further, the GUI view 1320 may include presence information using display objects 1332, 1334 and 1336, each including a status indicator and custom message that conveys ability and willingness of a potential communication partner, such as a user, to communicate. A display object 1338 labeled "New Msg" can be activated to begin communicating messages with a receiving device using one of the available message modalities or transports provided by the message application 105-3.

The GUI view 1340 provides an example of display objects 1342, 1344 which can be used to start a single or group chat. A user can start a chat with a single person by typing contact information into a text box of the display object 1342, and selecting a person from a list of contacts provided by the address widget. A user can start a chat with multiple individuals by adding additional recipients. When using a same voice service platform 132-1-r, adding "buddies" to the group chat may be accomplished using the address widget and a compose view. When using a different voice service platform 132-1-r, adding "buddies" to the group chat may be accomplished using the address widget and a compose view or separate views.

Figure 14:
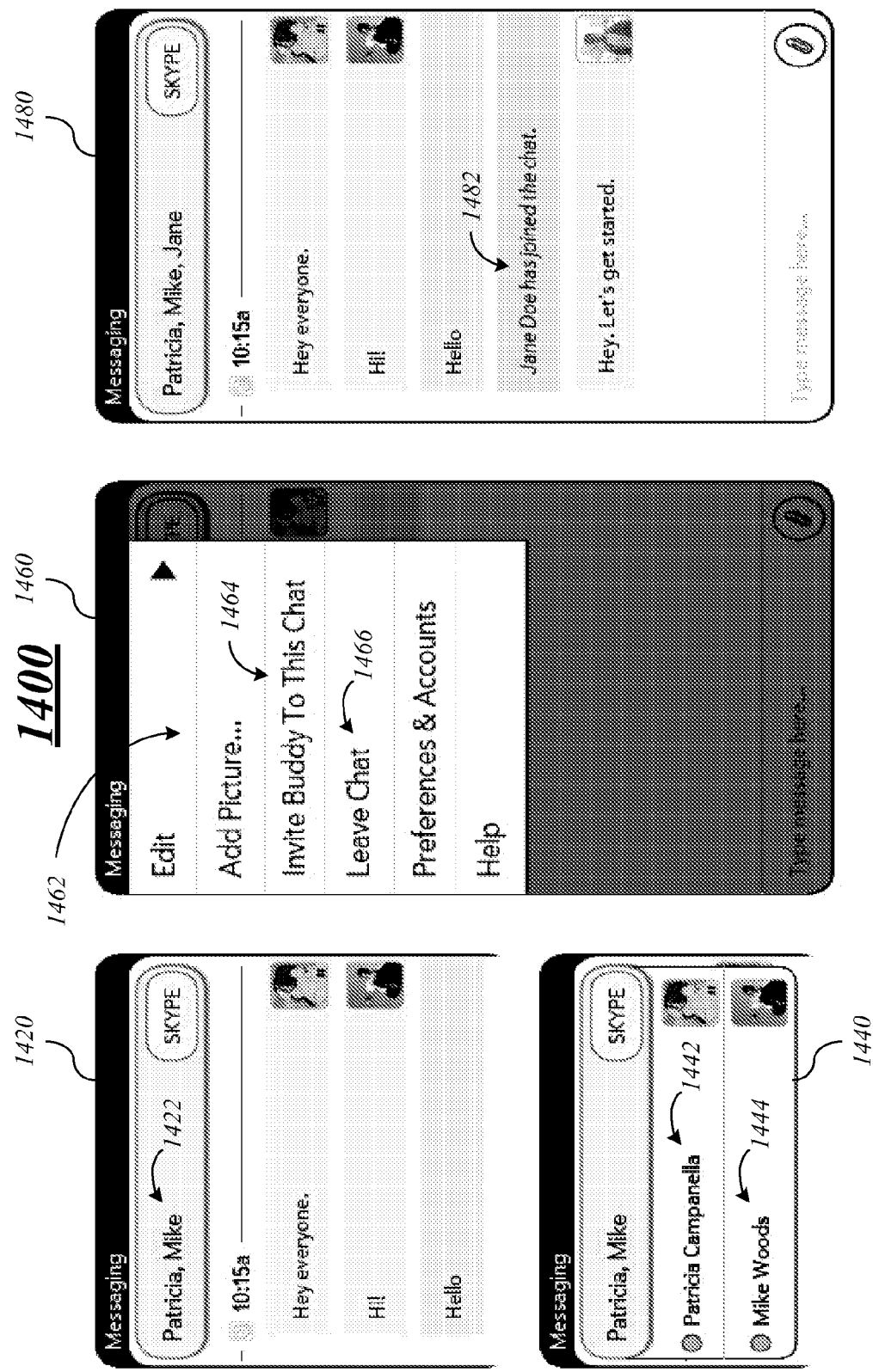
FIG. 14 illustrates one embodiment of a twelfth user interface.

FIG. 14 illustrates a GUI view 1400 of an integrated voice service GUI generated by the user interface 114 on behalf of the message application 105-3. The GUI view 1400 includes GUI views 1420, 1440, 1460 and 1480.

The GUI view 1420 shows an example of a group chat. A display object 1422 provides a header indicating parties in the group chat, and a VOP voice service platform 132-2 labeled "SKYPE." If all the names do not fit that may be truncated. Tapping the display object 1422 shows the GUI view 1440.

The GUI view 1440 shows an example of display objects indicating parties in a group chat. As shown, the GUI view 1440 includes display objects 1442, 1444 having respective contact information "Patricia Campanella" and "Mike Woods." Tapping any of the display objects 1442, 1444 opens a contact record associated with the contact information shown by the display objects 1442, 1444.

The GUI view 1460 shows an example of a display object 1462 for a chat view application menu. The chat view application menu, while in a chat, should be global across all transports. Tapping a display object 1464 labeled "Invite Buddy To This Chat" from the chat view application menu will show a picker similar to a contact picker showing all of the user's "buddies." Tapping a display object 1466 labeled "Leave Chat" should bring the user back to the conversations view. The chat should not be deleted from the list, but the user should stop receiving messages. Tapping the conversation again would allow the user to enter the chat.

The GUI view 1480 shows an example of a display object 1482 indicating that someone has joined the group chat. As shown, the display object 1482 may display a system message "Jane Doe has joined the chat" and add that person in the display object 1422 displaying the header.

Figure 15:
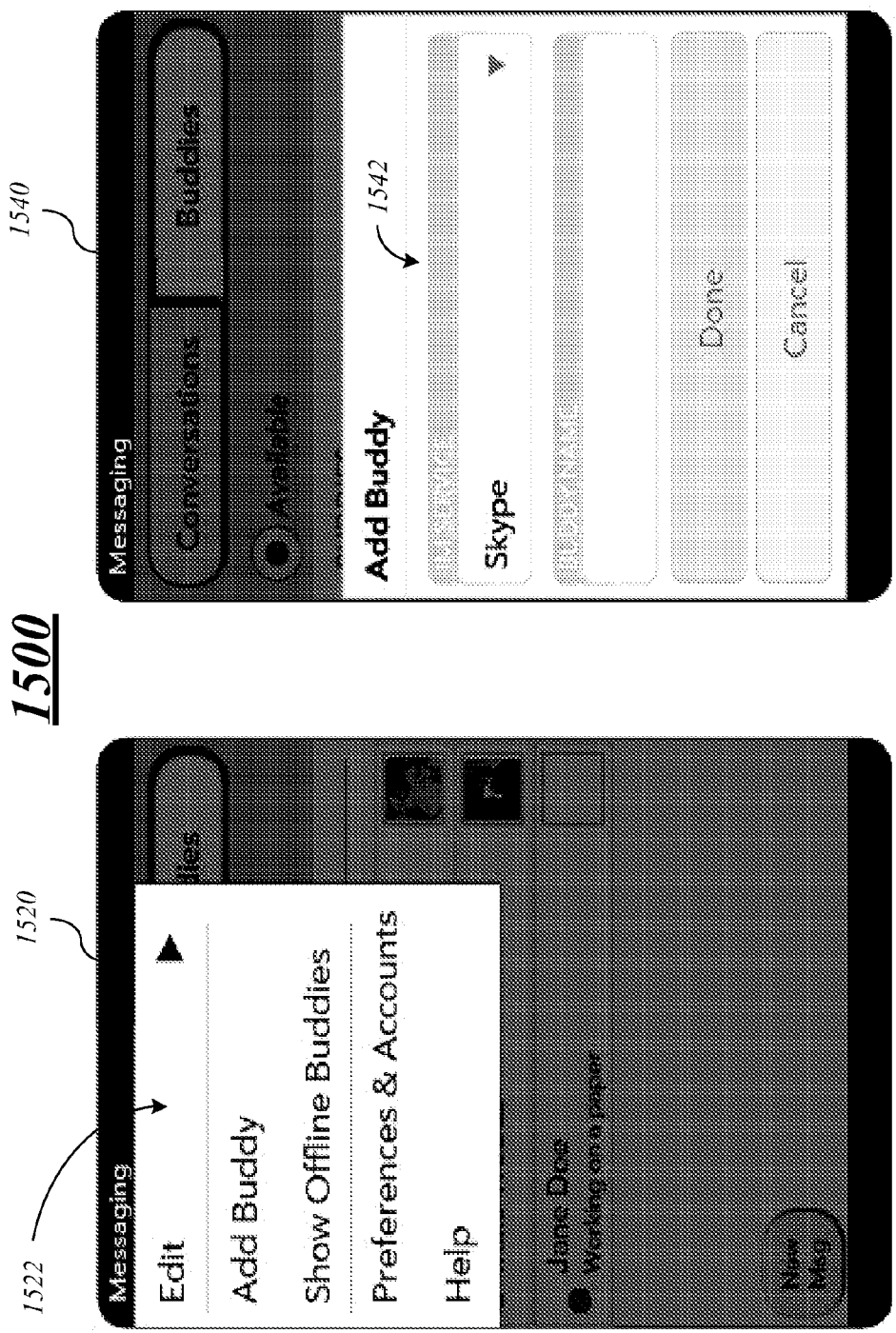
FIG. 15 illustrates one embodiment of a thirteenth user interface.

FIG. 15 illustrates a GUI view 1500 of an integrated voice service GUI generated by the user interface 114 on behalf of the message application 105-3. The GUI view 1500 includes GUI views 1520, 1540.

The GUI view 1520 shows an example of a display object 1522 with an options menu to add a buddy when the buddy tab is activated. As shown, the options menu may include "Add Buddy," "Show Offline Buddies," "Preferences & Accounts" and "Help."

The GUI view 1540 shows an example of a display object 1542 that appears when the "Add Buddy" menu option is tapped. A dialog box allows the user to add a buddy to any of the services that has a user name or other login credentials. The default value is the message service feature 134-3 that comes first in alphabetical order. There is also a text field that allows the user to enter the buddy name. The "Done" button should be disabled until a buddy name has been typed into the text field. Once this occurs, the "Done" button is enabled and when tapped, the buddy should be added to the contacts database and sent through the appropriate synergy operations to link to existing contact records for the contact application 105-2.

Account Setup

Various GUIs may be used to set up and modify accounts associated with the service features 134-1-s provided by the voice service platforms 132-1-r. This may be accomplished using one or more GUIs provided by the user interface 114 via one or more control directives 206-4, examples of which are provided in FIGS. 16-19.

Figure 16:
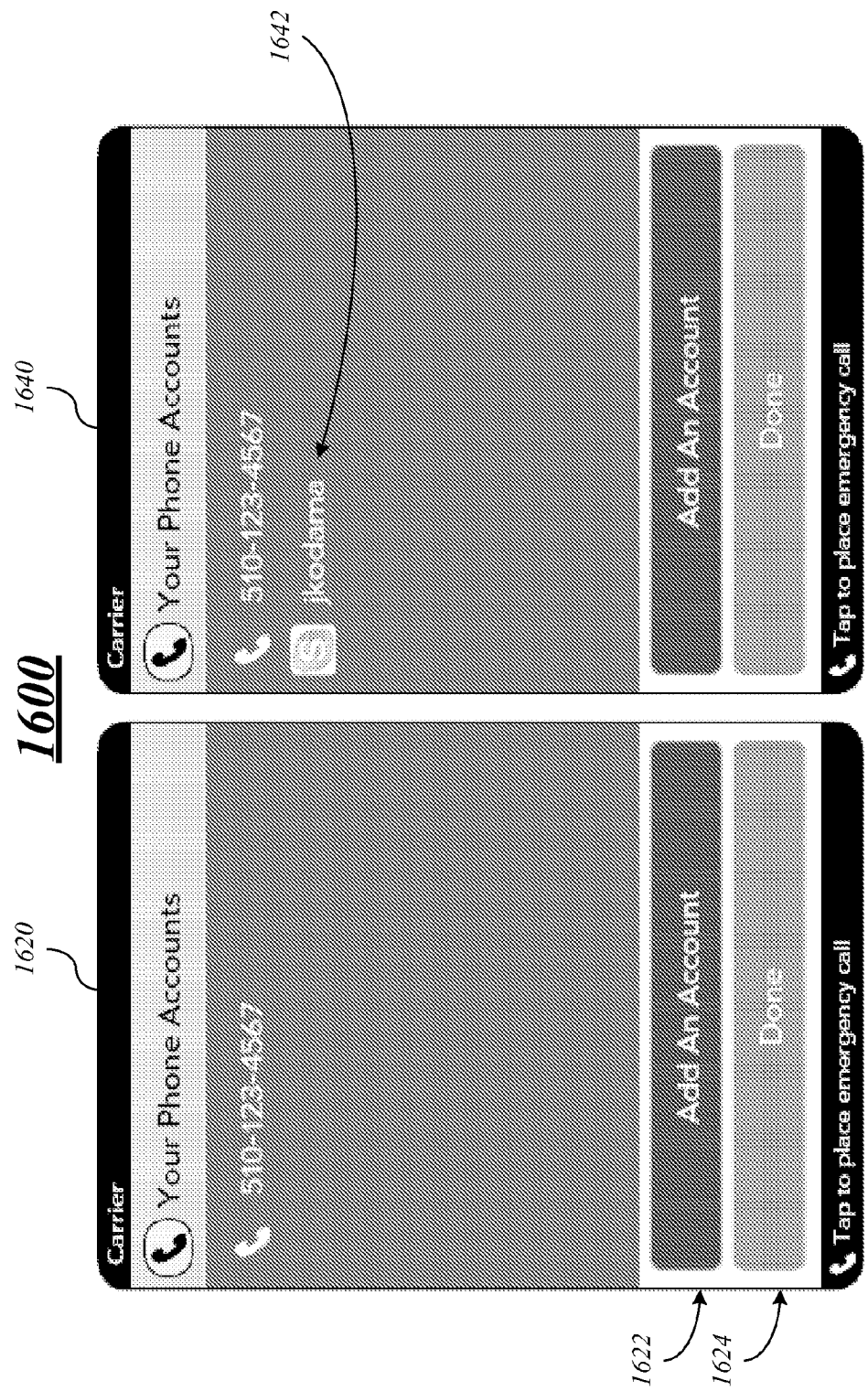
FIG. 16 illustrates one embodiment of a fourteenth user interface.

FIG. 16 illustrates a GUI view 1600 of an integrated voice service GUI generated by the user interface 114 on behalf of the voice service manager 104 and/or any of the applications 105-1-p. The GUI view 1600 includes GUI views 1620, 1640.

The GUI views 1620, 1640 illustrate a first launch GUI with a display object 1622 labeled "Add An Account" which may be used to add a service feature 134-1-s provided by a voice service platform 132-1-r from one or more of the application programs 105-1-p. The first launch GUI provides a mechanism for each voice service platform 132-1-r to register itself and enumerate its attributes. Examples of attributes may include its name, regions to which calls can be placed, cost of placing a call, networks one which service features are available, number of conference call participants, extra data associated with voice mail messages, and so forth. Examples of extra data associated with voice mail messages may include contact name, phone number, recording, transcription, priority, callback number, file attachments, and so forth. The embodiments are not limited in this context.

As shown, the phone application 105-1 has a first launch scene with an explicit account set up page when the phone application 105-1 is first launched. Additionally or alternatively, the contact application 105-2 and/or the message application 105-3 may have a first launch scene with an explicit account set up page when the corresponding application is first launched. When a VOP voice service platform 132-2 is set up, and a display object 1624 labeled "Done" is activated, corresponding accounts are automatically set up for the phone application 105-1, the contact application 105-2 and the message application 105-3. The new contact information may be displayed by a display object 1642 as shown by the GUI view 1640.

Figure 17:
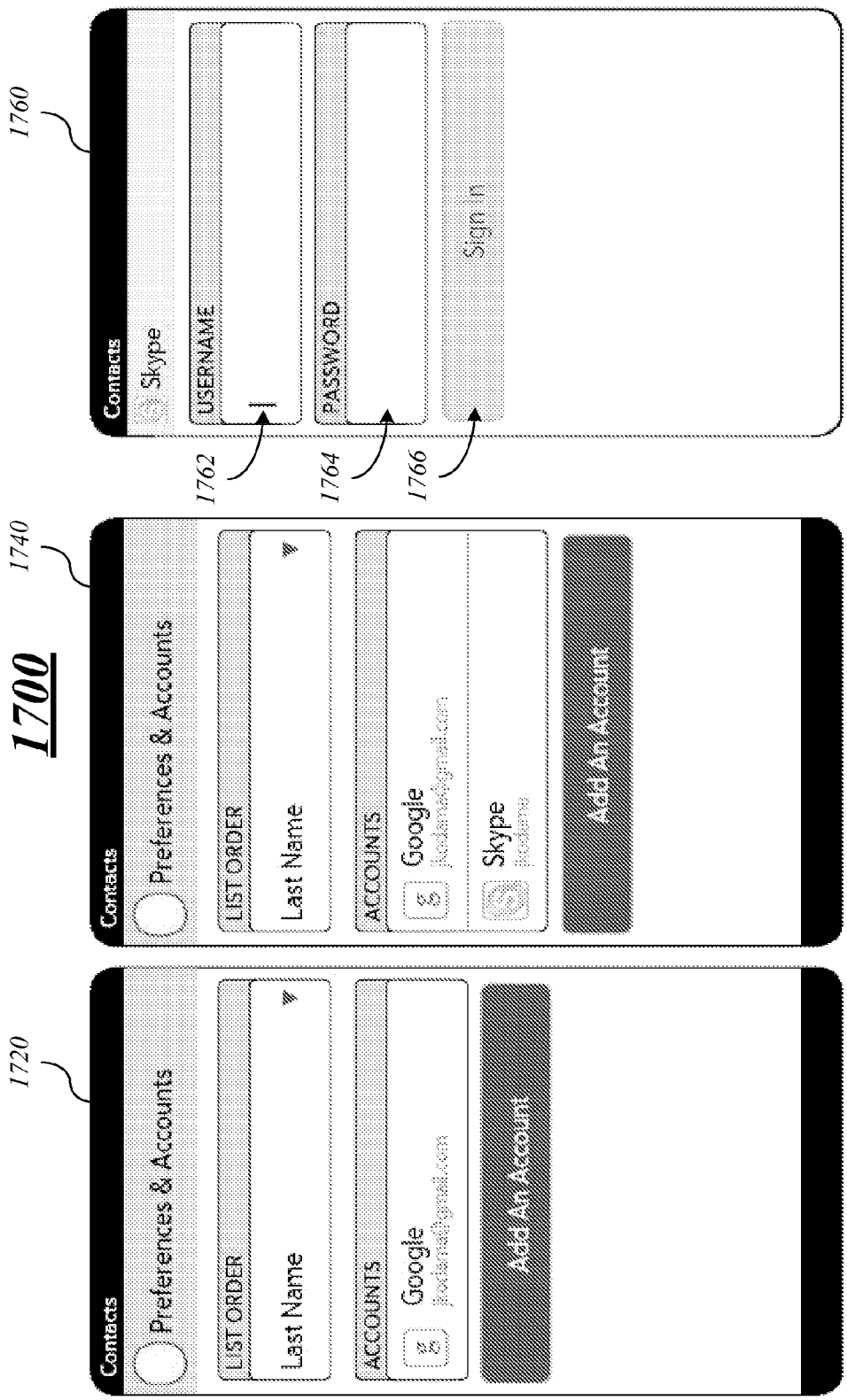
FIG. 17 illustrates one embodiment of a fifteenth user interface.

FIG. 17 illustrates a GUI view 1700 of an integrated voice service GUI generated by the user interface 114 on behalf of the voice service manager 104 and/or any of the applications 105-1-p. The GUI view 1700 includes GUI views 1720, 1740 and 1760.

New accounts for one or more service features 134-1-s provided by one or more voice service platforms 132-1-r may be set up from any of the application programs 105-1-p. For instance, the GUI views 1720, 1740 illustrate setting up a new VOP voice service platform 132-2 for Google Voice from the phone application 105-1. Setting up an account for one of the application programs 105-1-p automatically sets up accounts for the other application programs 105-1-p, which in this case would include the contact application 105-2 and the message application 105-3.

The GUI view 1760 provides an example of adding security credentials for a VOP voice service platform 132-2. As shown, a display object 1762 provides a text field for adding a user name, and a display object 1764 provides a text field for adding a password. Initial sign-in may be accomplished using a display object 1766 labeled "Sign In." In one embodiment, sign in operations are launched manually during account set up but are automatic for subsequent operations.

Figure 18:
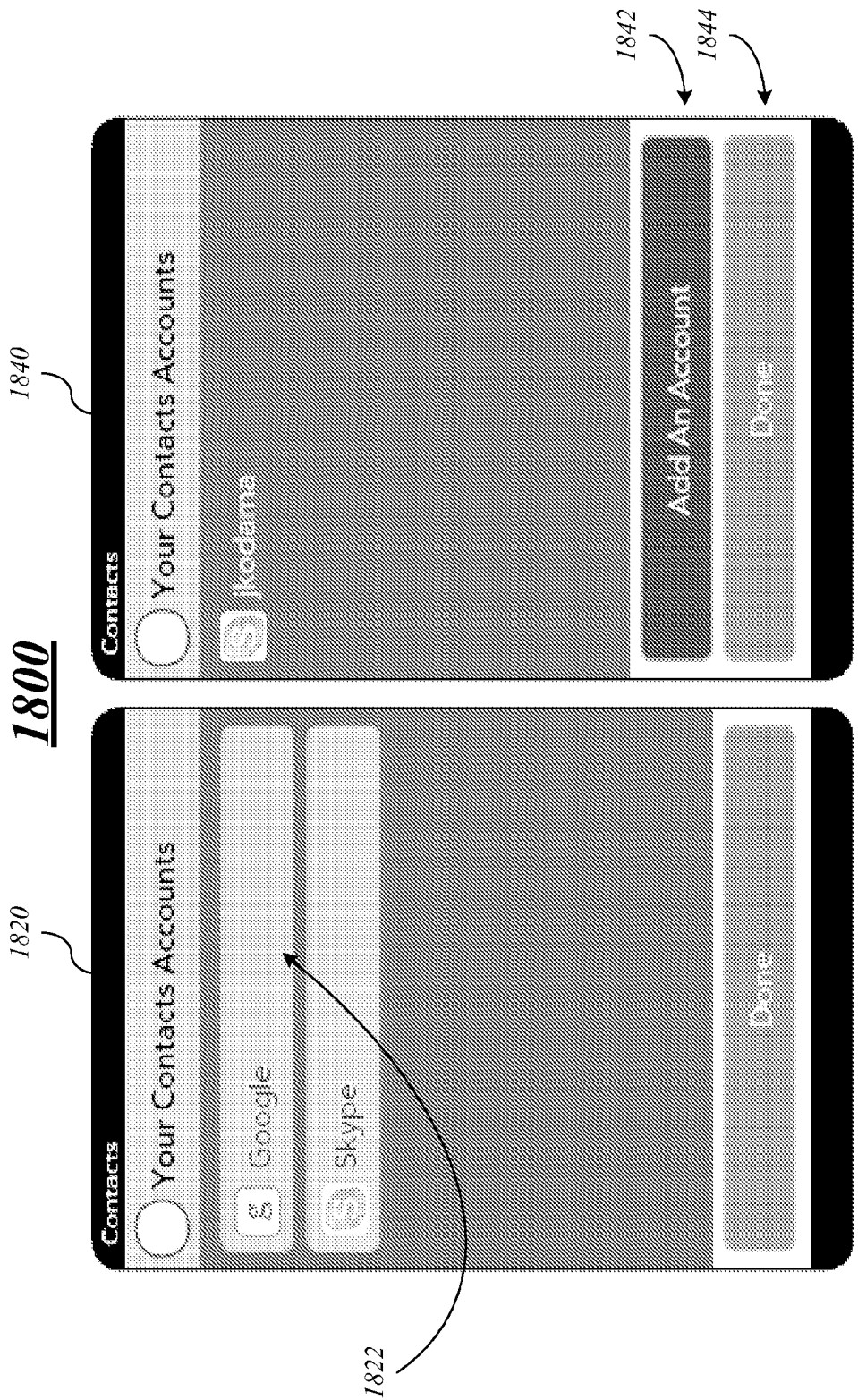
FIG. 18 illustrates one embodiment of a sixteenth user interface.

FIG. 18 illustrates a GUI view 1800 of an integrated voice service GUI generated by the user interface 114 on behalf of the voice service manager 104 and/or any of the applications 105-1-p. The GUI view 1800 includes GUI views 1820, 1840.

The GUI views 1820, 1840 illustrate a first launch GUI with a display object 1842 labeled "Add An Account" which may be used to add a service feature 134-1-s provided by a voice service platform 132-1-r from one or more of the application programs 105-1-p. As shown, the contact application 105-2 may have a first launch scene with an explicit account set up page when the contact application 105-2 is first launched. When a VOP voice service platform 132-2 is set up, and a display object 1844 labeled "Done" is activated, corresponding accounts are automatically set up for the phone application 105-1 and the message application 105-3. The new contact information may be displayed by a display object 1822 as shown by the GUI view 1820.

Figure 19:
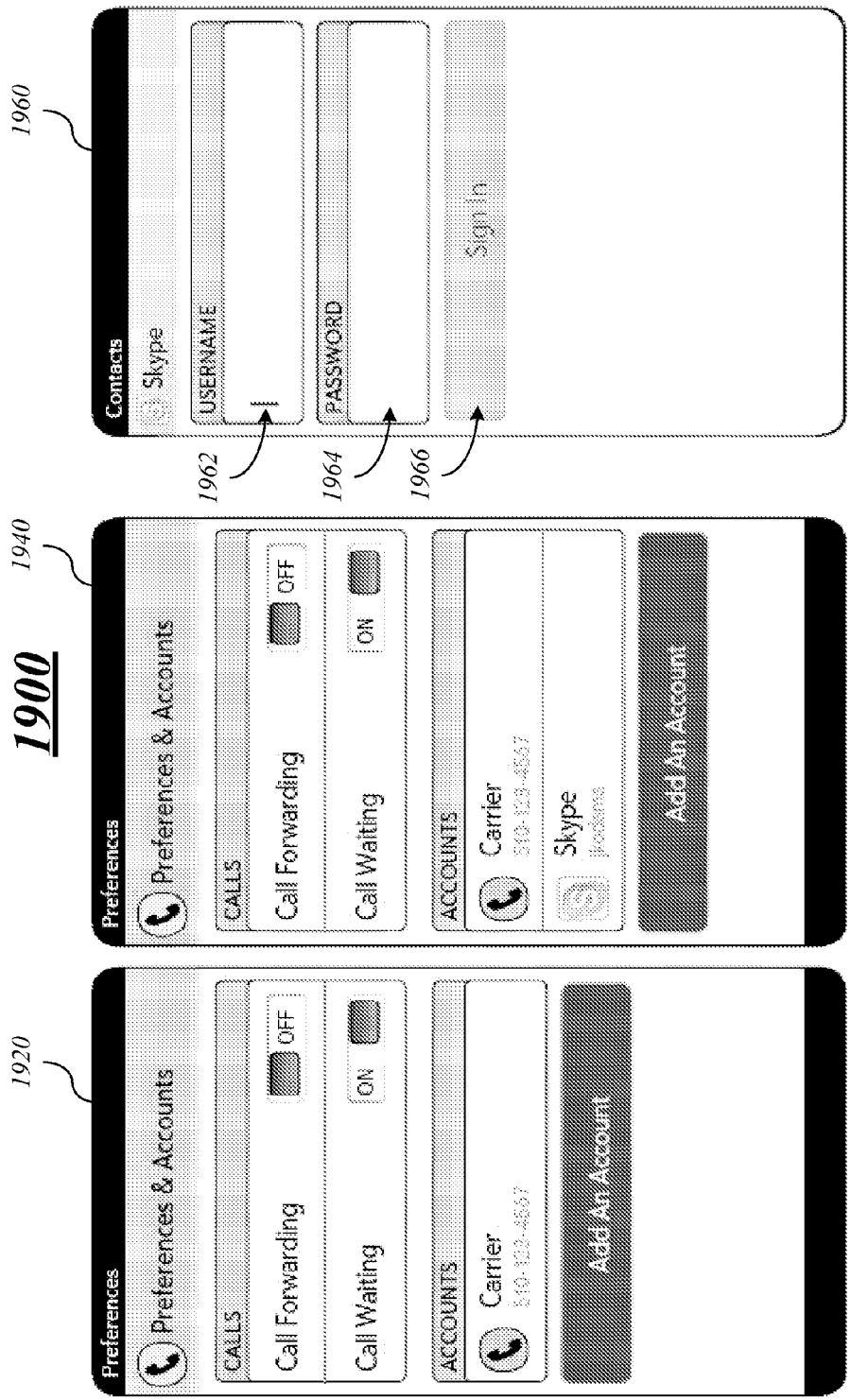
FIG. 19 illustrates one embodiment of a seventeenth user interface.

FIG. 19 illustrates a GUI view 1900 of an integrated voice service GUI generated by the user interface 114 on behalf of the voice service manager 104 and/or any of the applications 105-1-p. The GUI view 1900 includes GUI views 1920, 1940 and 1960.

Similar to the GUI view 1700, new accounts for one or more service features 134-1-s provided by one or more voice service platforms 132-1-r may be set up from any of the application programs 105-1-p. For instance, the GUI views 1920, 1940 illustrate setting up a new VOP voice service platform 132-2 for Skype from the contact application 105-2. Setting up an account for one of the application programs 105-1-p automatically sets up accounts for the other application programs 105-1-p, which in this case would include the phone application 105-1 and the message application 105-3.

The GUI view 1960 provides an example of adding security credentials for a VOP voice service platform 132-2. As shown, a display object 1962 provides a text field for adding a user name, and a display object 1964 provides a text field for adding a password. Initial sign-in may be accomplished using a display object 1966 labeled "Sign In." In one embodiment, sign in operations are launched manually during account set up but are automatic for subsequent operations.

Operations for the above embodiments may be further described with reference to the following figures and accompanying examples. Some of the figures may include a logic flow and/or a logic diagram. Although such figures presented herein may include a particular logic flow and/or logic diagram, it can be appreciated that the logic flow and/or logic diagram merely provides an example of how the general functionality as described herein can be implemented. Further, the given logic flow and/or logic diagram does not necessarily have to be executed in the order presented, unless otherwise indicated. In addition, the given logic flow and/or logic diagram may be implemented by a hardware element (e.g., a logic device), a software element executed by a processor, or any combination thereof. The embodiments are not limited in this context.

FIG. 20 illustrates a logic flow. In particular, FIG. 20 illustrates a logic flow 2000, which may be representative of the operations executed by one or more embodiments described herein.

As shown in the FIG. 20, the logic flow 2000 may receive control directives from one or more application programs at block 2002. In one embodiment, for example, the voice service manager 104 may receive control directives 206-1-t from one or more application programs 105-1-p. The application programs 105-1-p may also receive control directives from each other or another component of the mobile computing device 110. Additionally or alternatively, the voice service manager 104 may receive user control directives directly from a user via the user interface 114. The embodiments are not limited in this context.

The logic flow 2000 may manage one or more service features of multiple voice service platforms for a mobile computing device based on the received control directives, with at least one of the multiple voice service platforms comprising a voice over packet voice service platform, at block 2004. In one embodiment, for example, the voice service manager 104 may manage one or more service features 134-1-s provided by multiple voice service platforms 132-1-r for the mobile computing device 110 based on the received control directives 206-1-t, with at least one of the multiple voice service platforms 132-1-r comprising a VOP voice service platform 132-2. The embodiments are not limited in this context.

Figure 21:
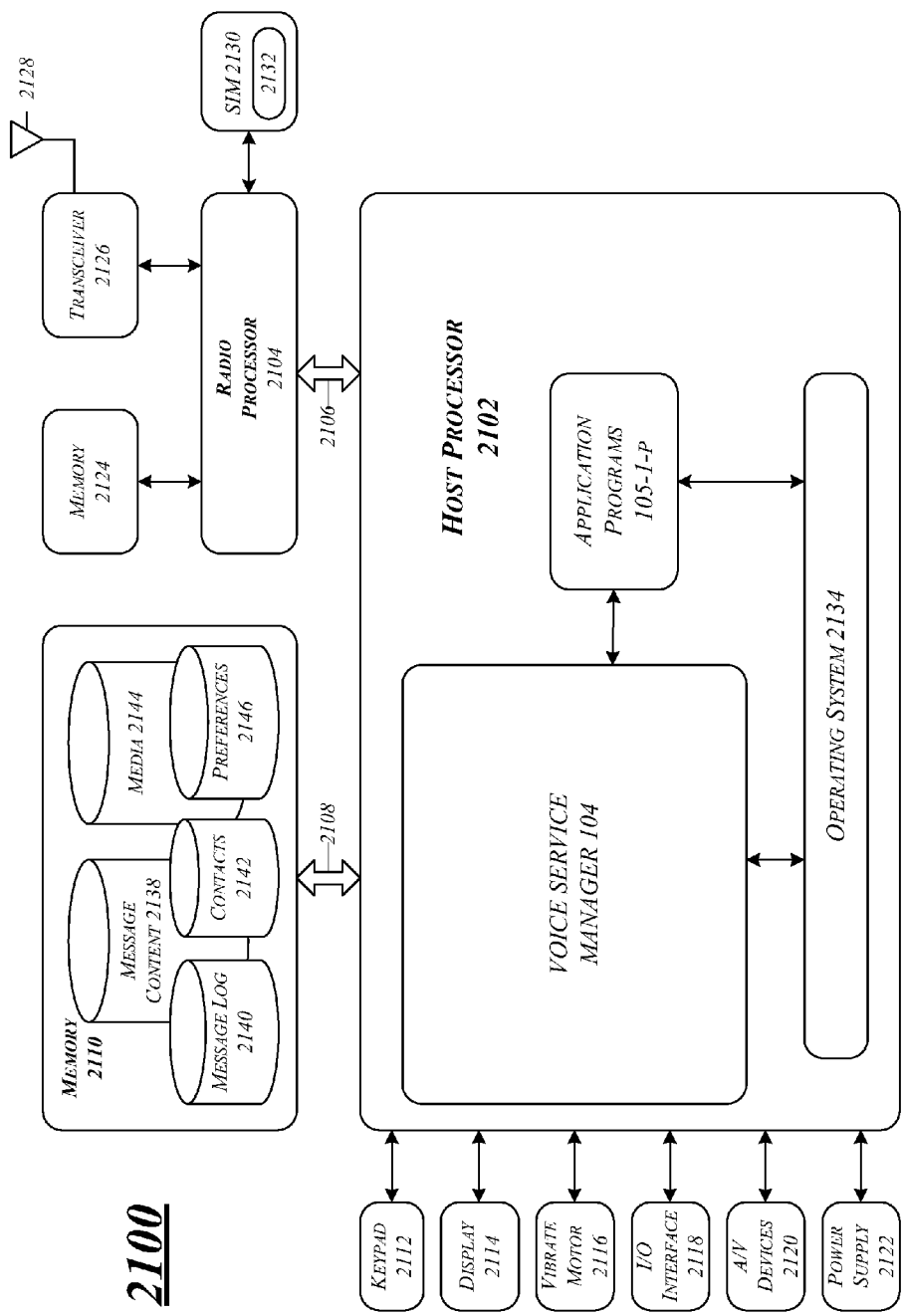
FIG. 21 illustrates one embodiment of a second mobile computing device.

FIG. 21 illustrates a block diagram of a second mobile computing device 2100 suitable for implementing various embodiments, including the mobile computing device 110. It may be appreciated that the mobile computing device 2100 is only one example of a suitable mobile computing environment and is not intended to suggest any limitation as to the scope of use or functionality of the embodiments. Neither should the mobile computing device 2100 be interpreted as having any dependency or requirement relating to any one or combination of components illustrated in the exemplary mobile computing device 2100.

The host processor 2102 (e.g., similar to the processor 102) may be responsible for executing various software programs such as system programs and applications programs to provide computing and processing operations for the mobile computing device 2100. The radio processor 2104 may be responsible for performing various voice and data communications operations for the mobile computing device 2100 such as transmitting and receiving voice and data information over one or more wireless communications channels. Although the mobile computing device 2100 is shown with a dual-processor architecture, it may be appreciated that the mobile computing device 2100 may use any suitable processor architecture and/or any suitable number of processors or number of processor cores in accordance with the described embodiments. In one embodiment, for example, the processors 2102, 2104 may be implemented using a single integrated processor.

The host processor 2102 may be implemented as a host central processing unit (CPU) using any suitable processor or logic device, such as a as a general purpose processor. The host processor 2102 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 2102 may be coupled through a memory bus 2108 to a memory 2110. The memory bus 2108 may comprise any suitable interface and/or bus architecture for allowing the host processor 2102 to access the memory 2110. Although the memory 2110 may be shown as being separate from the host processor 2102 for purposes of illustration, it is worthy to note that in various embodiments some portion or the entire memory 2110 may be included on the same integrated circuit as the host processor 2102. Alternatively, some portion or the entire memory 2110 may be disposed on an integrated circuit or other medium (e.g., hard disk drive) external to the integrated circuit of the host processor 2102. In various embodiments, the mobile computing device 2100 may comprise an expansion slot to support a multimedia and/or memory card, for example.

The memory 2110 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 2100 may comprise an alphanumeric keypad 2112 coupled to the host processor 2102. The keypad 2112 may comprise, for example, a QWERTY key layout and an integrated number dial pad. The mobile computing device 2100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 2112 may comprise a physical keypad using hard buttons, or a virtual keypad using soft buttons displayed on a display 2114. The keypad may also comprise a thumbboard.

The mobile computing device 2100 may comprise a display 2114 coupled to the host processor 2102. The display 2114 may comprise any suitable visual interface for displaying content to a user of the mobile computing device 2100. In one embodiment, for example, the display 2114 may be implemented by a liquid crystal display (LCD) such as a touch-sensitive or touch screen color (e.g., 216-bit color) thin-film transistor (TFT) LCD screen. The touch-sensitive or touch screen LCD may be used with a stylus and/or a handwriting recognizer program.

The mobile computing device 2100 may comprise a vibrating motor 2116 coupled to the host processor 2102. The vibrating motor 2116 may be enable or disabled according to the preferences of the user of the mobile computing device 2100. When enabled, the vibrating motor 2116 may cause the mobile computing device 2100 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 2100 may comprise an input/output (I/O) interface 2118 coupled to the host processor 2102. The I/O interface 2118 may comprise one or more I/O devices such as a serial connection port, SDIO bus, PCI, USB, an infrared port, integrated Bluetooth wireless capability, global position system (GPS) capability, and/or integrated 802.11x (e.g. 802.11b, 802.11g, 802.11a, 802.11n, etc.) (WiFi) wireless capability, to enable wired (e.g., USB cable) and/or wireless connection to a local computer system, such as a local personal computer (PC). In various implementations, mobile computing device 2100 may be arranged to synchronize information with a local computer system.

The host processor 2102 may be coupled to various audio/video (A/V) devices 2120 that support A/V capability of the mobile computing device 2100. Examples of A/V devices 2120 may include, for example, a microphone, one or more speakers (such as speaker system 108), an audio port to connect an audio headset, an audio coder/decoder (codec), an audio player, a Musical Instrument Digital Interface (MIDI) device, a digital camera, a video camera, a video codec, a video player, and so forth.

The host processor 2102 may be coupled to a power supply 2122 arranged to supply and manage power to the elements of the mobile computing device 2100. In various embodiments, the power supply 2122 may be implemented by a rechargeable battery, such as a removable and rechargeable lithium ion battery to provide direct current (DC) power, and/or an alternating current (AC) adapter to draw power from a standard AC main power supply. The power supply 2122 may be representative of a power supply for the power module 108 described with reference to FIG. 1, for example.

The radio processor 2104 may be arranged to communicate voice information and/or data information over one or more assigned frequency bands of a wireless communication channel. The radio processor 2104 may be implemented as a communications processor using any suitable processor or logic device, such as a modem processor or baseband processor. The radio processor 2104 may also be implemented as a digital signal processor (DSP), media access control (MAC) processor, or any other type of communications processor in accordance with the described embodiments. The radio processor 2104 may perform analog and/or digital baseband operations for the mobile computing device 2100. For example, the radio processor 2104 may perform digital-to-analog conversion (DAC), analog-to-digital conversion (ADC), modulation, demodulation, encoding, decoding, encryption, decryption, and so forth. The radio processor 2104 may be representative of a radio processor for the radio module 106 described with reference to FIG. 1, for example.

The mobile computing device 2100 may comprise a memory 2124 coupled to the radio processor 2104. The memory 2124 may be implemented using any of the computer-readable media described with reference to the memory 2110. The memory 2124 may be typically implemented as flash memory and synchronous dynamic random access memory (SDRAM). Although the memory 2124 may be shown as being separate from the radio processor 2104, some or all of the memory 2124 may be included on the same IC as the radio processor 2104.

The mobile computing device 2100 may comprise a transceiver module 2126 coupled to the radio processor 2104. The transceiver module 2126 may comprise one or more transceivers or radios, such as wireless transceivers 108 of mobile computing device 100, arranged to communicate using different types of protocols, communication ranges, operating power requirements, RF sub-bands, information types (e.g., voice or data), use scenarios, applications, and so forth. In various embodiments, the transceiver module 2126 may comprise one or more transceivers arranged to support voice communications and/or data communications for the wireless network systems or protocols as previously described. In some embodiments, the transceiver module 2126 may further comprise a Global Positioning System (GPS) transceiver to support position determination and/or location-based services.

The transceiver module 2126 generally may be implemented using one or more chips as desired for a given implementation. Although the transceiver module 2126 may be shown as being separate from and external to the radio processor 2104 for purposes of illustration, it is worthy to note that in various embodiments some portion or the entire transceiver module 2126 may be included on the same integrated circuit as the radio processor 2104. The embodiments are not limited in this context.

The mobile computing device 2100 may comprise an antenna system 2128 for transmitting and/or receiving electrical signals. As shown, the antenna system 2128 may be coupled to the radio processor 2104 through the transceiver module 2126. The antenna system 2128 may comprise or be implemented as one or more internal antennas and/or external antennas, such as antenna 112 of mobile computing device 100.

The mobile computing device 2100 may comprise a subscriber identity module (SIM) 2130 coupled to the radio processor 2104. The SIM 2130 may comprise, for example, a removable or non-removable smart card arranged to encrypt voice and data transmissions and to store user-specific data for allowing a voice or data communications network to identify and authenticate the user. The SIM 2130 also may store data such as personal settings specific to the user. In some embodiments, the SIM 2130 may be implemented as an UMTS universal SIM (USIM) card or a CDMA removable user identity module (RUIM) card. The SIM 2130 may comprise a SIM application toolkit (STK) 2132 comprising a set of programmed commands for enabling the SIM 2130 to perform various functions. In some cases, the STK 2132 may be arranged to enable the SIM 2130 to independently control various aspects of the mobile computing device 2100.

As mentioned above, the host processor 2102 may be arranged to provide processing or computing resources to the mobile computing device 2100. For example, the host processor 2102 may be responsible for executing various software programs including system programs such as operating system (OS) 2134 and application programs 2136. System programs generally may assist in the running of the mobile computing device 2100 and may be directly responsible for controlling, integrating, and managing the individual hardware components of the computer system. The OS 2134 may be implemented, for example, as a Palm WebOS®, Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 2100 may comprise other system programs such as device drivers, programming tools, utility programs, software libraries, application programming interfaces (APIs), and so forth.

Application programs 2136 generally may allow a user to accomplish one or more specific tasks. In various implementations, the application programs 2136 may provide one or more graphical user interfaces (GUIs) to communicate information between the mobile computing device 2100 and a user. In some embodiments, application programs 2136 may comprise upper layer programs running on top of the OS 21321 of the host processor 2102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 2136 may include, without limitation, message applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Message applications may be arranged to communicate various types of messages in a variety of formats. Examples of message applications may include without limitation a cellular telephone application, a Voice over Internet Protocol (VoIP) application, a Push-to-Talk (PTT) application, a voicemail application, a facsimile application, a video teleconferencing application, an IM application, an email application, an SMS application, an MMS application, and so forth. It is also to be appreciated that the mobile computing device 2100 may implement other types of applications in accordance with the described embodiments.

The host processor 2102 may include the voice service manager 104 and the application program 105-1-$p$ in some embodiments, as described with reference to FIG. 1, for example.

The mobile computing device 2100 may include various databases implemented in the memory 2110. For example, the mobile computing device 2100 may include a message content database 2138, a message log database 2140, a contacts database 2142, a media database 2144, a preferences database 2146, and so forth. The message content database 2138 may be arranged to store content and attachments (e.g., media objects) for various types of messages sent and received by one or more message applications. The message log 2140 may be arranged to track various types of messages which are sent and received by one or more message applications. The contacts database 2142 may be arranged to store contact records for individuals or entities specified by the user of the mobile computing device 2100. The media database 2144 may be arranged to store various types of media content such as image information, audio information, video information, and/or other data. The preferences database 2146 may be arranged to store various settings such as rules and parameters for controlling the operation of the mobile computing device 2100.

In some cases, various embodiments may be implemented as an article of manufacture. The article of manufacture may include a computer readable storage medium arranged to store logic, instructions and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
   a voice service manager operative to: receive a control directive from one or more application programs, the control directive to initiate voice service features provided by one of multiple voice service platforms:
   select a voice service from the multiple voice service platforms in accordance with communication parameters and selection rules, the communication parameters including a list of available voice services, a transmission quality parameter, a communication protocol, a device capability, a voice service feature, cost value, user preference; and
   manage one or more voice service features provided by the multiple voice service platforms for a mobile computing device based on the received control directive, with at least one of the multiple voice service platforms comprising a voice over packet voice service platform.

2. The mobile computing device of claim 1, comprising a phone application communicatively coupled to the voice service manager, the phone application operative to send a control directive to initiate voice service features or voicemail service features provided by one of the multiple voice service platforms.

3. The mobile computing device of claim 1, comprising a contact application communicatively coupled to the voice service manager, the contact application operative to send a control directive to initiate voice service features or voicemail service features provided by one of the multiple voice service platforms.

4. The mobile computing device of claim 1, comprising a message application communicatively coupled to the voice service manager, the message application operative to send a control directive to initiate message service features associated with one of the multiple voice service platforms.

5. The mobile computing device of claim 1, the voice service manager operative to receive a control directive to initiate voice service features, a voicemail service feature or a message service feature provided by one of the multiple voice service platforms.

6. The mobile computing device of claim 1, the voice service manager operative to receive a control directive having a unique contact identifier for one of the multiple voice service platforms.

7. The mobile computing device of claim 1, the voice service manager operative to receive a control directive having a shared contact identifier, the shared contact identifier having multiple contact identifiers each associated with one of the multiple voice service platforms.

8. The mobile computing device of claim 1, the voice service manager operative to receive a control directive to initiate voice service features provided by one of the multiple voice service platforms, select a voice service from the multiple voice service platforms, and establish a voice session over a wireless communications channel using the selected voice service.

9. The mobile computing device of claim 1, the voice service manager operative to receive a control directive to initiate voicemail service features provided by one of the multiple voice service platforms, select one or more voicemail service features from the multiple voice service platforms, and retrieve one or more voicemail messages over a wireless communications channel using the one or more selected voice services.

10. The mobile computing device of claim 1, the voice service manager operative to receive a control directive to initiate message service features associated with one of the multiple voice service platforms, select a message service associated with one of the multiple voice service platforms, and establish a message session for the selected message service.

11. A method, comprising: receiving a control directive from one or more application programs: the control directive to initiate voice service features provided by one of multiple voice service platforms;
   selecting a voice service from the multiple voice service platforms in accordance with communication parameters and selection rules, the communication parameters including a list of available voice services, a transmission quality parameter, a communication protocol, a device capability, a voice service feature, cost value, user preference; and
   managing one or more voice service features provided by the multiple voice service platforms for a mobile computing device based on the received control directive, with at least one of the multiple voice service platforms comprising a voice over packet voice service platform.

12. The method of claim 11, comprising receiving a control directive to initiate voice service features, voicemail service features or message service features provided by one of the multiple voice service platforms.

13. The method of claim 11, comprising receiving a control directive having a unique contact identifier for one of the multiple voice service platforms.

14. The method of claim 11, comprising receiving a control directive having a shared contact identifier, the shared contact identifier having multiple contact identifiers each associated with one of the multiple voice service platforms.

15. The method of claim 11, comprising selecting a voice service from the multiple voice service platforms to establish a voice or data connection over a wireless communications channel.

16. The method of claim 11, comprising establishing a voice or data connection over a wireless communications channel using a selected voice service.

17. The method of claim 11, comprising establishing a voice or data connection over a wireless communications channel using an application program interface associated with a selected voice service.

18. The method of claim 11, comprising displaying one or more display objects for a selected voice service by an integrated voice service graphical user interface.

19. The method of claim 11, comprising receiving a control directive to initiate voicemail service features associated with one or more of the multiple voice service platforms.

20. The method of claim 19, comprising selecting a voicemail service associated with one of the multiple voice service platforms to establish a voice or data connection over a wireless communications channel.

21. The method of claim 19, comprising establishing a voice or data connection over a wireless communications channel using a selected voicemail service.

22. The method of claim 19, comprising establishing a voice or data connection over a wireless communications channel using an application program interface associated with a selected voicemail service.

23. The method of claim 19, comprising retrieving one or more voice messages for a selected voicemail service.

24. The method of claim 19, comprising displaying one or more display objects for a selected voicemail service by a unified voice message graphical user interface.

25. The method of claim 11, comprising receiving a control directive to initiate message service features associated with one of the multiple voice service platforms.

26. The method of claim 25, comprising selecting a message service associated with one of the multiple voice service platforms.

27. The method of claim 25, comprising establishing a message session for a selected message service associated with one of the multiple voice service platforms.

28. The method of claim 25, comprising displaying one or more display objects for a selected message service by a unified message graphical user interface.

29. An article of manufacture comprising a non-transitory computer-readable storage medium containing instructions that when executed by a processor enable a system to:

receive a control directive from one or more application programs, the control directive to initiate voice service features provided by one of multiple voice service platforms;

select a voice service from the multiple voice service platforms in accordance with communication parameters and selection rules, the communication parameters including a list of available voice services, a transmission quality parameter, a communication protocol, a device capability, a voice service feature, cost value, user preference; and manage one or more voice service features provided by the multiple voice service platforms for a mobile computing device based on the received control directive, with at least one of the multiple voice service platforms comprising a voice over packet voice service platform.

30. The article of manufacture of claim 29, further comprising instructions that when executed by the processor enable the system to receive a control directive to initiate voice service features provided by one of the multiple voice service platforms, select a voice service from the multiple voice service platforms, and establish a voice session over a wireless communications channel using the selected voice service.

31. The article of manufacture of claim 29, further comprising instructions that when executed by the processor enable the system to receive a control directive to initiate voicemail service features provided by one of the multiple voice service platforms, select one or more voicemail service features from the multiple voice service platforms, and retrieve one or more voicemail messages over a wireless communications channel using the one or more selected voice services.

32. The article of manufacture of claim 29, further comprising instructions that when executed by the processor enable the system to receive a control directive having a unique contact identifier for one of the multiple voice service platforms.

33. The article of manufacture of claim 29, further comprising instructions that when executed by the processor enable the system to receive a control directive having a shared contact identifier, the shared contact identifier having multiple contact identifiers each associated with one of the multiple voice service platforms.

34. The article of manufacture of claim 29, further comprising instructions that when executed by the processor enable the system to establish a voice or data connection over a wireless communications channel using an application program interface associated with one of the multiple voice service platforms.

35. The article of manufacture of claim 29, further comprising instructions that when executed by the processor enable the system to generate a graphical user interface with one or more display objects for one or more service features associated with one of the multiple voice service platforms.

* * * * *